(12) United States Patent
Hirota et al.

(10) Patent No.: US 10,684,116 B2
(45) Date of Patent: *Jun. 16, 2020

(54) POSITION AND ORIENTATION MEASURING APPARATUS, INFORMATION PROCESSING APPARATUS AND INFORMATION PROCESSING METHOD

(71) Applicant: CANON KABUSHIKI KAISHA, Tokyo (JP)

(72) Inventors: Yuichiro Hirota, Tokyo (JP); Keisuke Tateno, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/644,546

(22) Filed: Jul. 7, 2017

(65) Prior Publication Data
US 2017/0307354 A1   Oct. 26, 2017

Related U.S. Application Data

(63) Continuation of application No. 14/173,741, filed on Feb. 5, 2014, now Pat. No. 9,704,248.

(30) Foreign Application Priority Data

Feb. 7, 2013  (JP) ................................. 2013-022372
Oct. 25, 2013  (JP) ................................. 2013-222526

(51) Int. Cl.
*G01B 11/00* (2006.01)
*G06K 9/00* (2006.01)
(Continued)

(52) U.S. Cl.
CPC ........ *G01B 11/002* (2013.01); *G01B 11/2513* (2013.01); *G01S 5/163* (2013.01);
(Continued)

(58) Field of Classification Search
CPC .......... G06K 9/6857; G06T 7/74; G06T 7/70; G06T 7/0004
See application file for complete search history.

(56) References Cited

U.S. PATENT DOCUMENTS 6,985,620 B2 *  1/2006  Sawhney ................ G01S 5/163
                                                              345/419
7,889,905 B2 *  2/2011  Higgins ............. A61B 1/00147
                                                              382/130
(Continued)

FOREIGN PATENT DOCUMENTS

JP    2011179910 A    9/2011
JP    2012021958 A    2/2012
JP    2012163450 A    8/2012

*Primary Examiner* — Utpal D Shah
(74) *Attorney, Agent, or Firm* — Canon U.S.A., Inc. I.P. Division

(57) ABSTRACT

There is provided a position and orientation measurement apparatus, information processing apparatus, and an information processing method, capable of performing robust measurement of a position and orientation. In order to achieve the apparatuses and method, at least one coarse position and orientation of a target object is acquired from an image including the target object, at least one candidate position and orientation is newly generated as an initial value used for deriving a position and orientation of the target object based on the acquired coarse position and orientation, and the position and orientation of the target object in the image is derived by using model information of the target object and by performing at least once of fitting processing of the candidate position and orientation generated as the initial value with the target object in the image.

11 Claims, 17 Drawing Sheets

(51) Int. Cl.
    *G06T 7/73*     (2017.01)
    *G06T 7/521*    (2017.01)
    *G01B 11/25*    (2006.01)
    *G01S 5/16*     (2006.01)

(52) U.S. Cl.
    CPC ..... *G06K 9/00201* (2013.01); *G06K 9/00208* (2013.01); *G06T 7/521* (2017.01); *G06T 7/75* (2017.01); *G06T 2207/20016* (2013.01)

(56) References Cited

U.S. PATENT DOCUMENTS

| | | | |
|---|---|---|---|
| 2010/0098339 A1* | 4/2010 | Kido | G06K 9/6253 382/199 |
| 2010/0166294 A1* | 7/2010 | Marrion | G06K 9/00214 382/154 |
| 2011/0150286 A1* | 6/2011 | Ishigami | G06K 9/00993 382/106 |
| 2011/0211066 A1* | 9/2011 | Fujiki | H04N 7/181 348/135 |
| 2012/0120199 A1* | 5/2012 | Ben Himane | G06T 7/75 348/46 |
| 2012/0147149 A1* | 6/2012 | Liu | G06T 7/75 348/50 |
| 2012/0148145 A1* | 6/2012 | Liu | G06K 9/209 382/154 |
| 2012/0158180 A1* | 6/2012 | Iio | B25J 9/1679 700/259 |
| 2013/0156262 A1* | 6/2013 | Taguchi | G06T 7/75 382/103 |
| 2013/0182948 A1* | 7/2013 | Barker | G06K 9/6256 382/159 |
| 2014/0118500 A1* | 5/2014 | Liu | G06K 9/209 348/46 |

\* cited by examiner

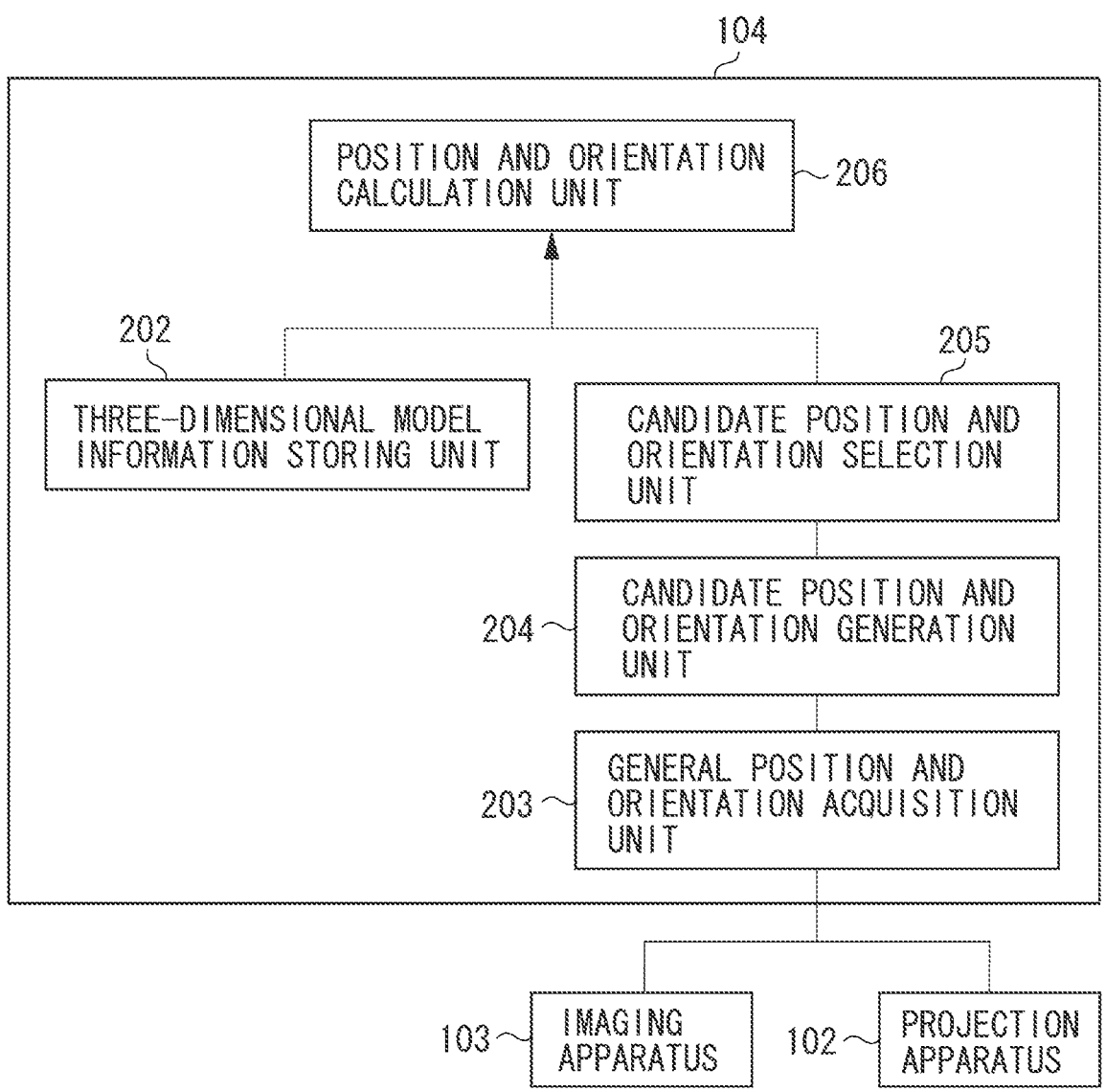

FIG. 3D

| POINT | x | y | z |
|---|---|---|---|
| P1 | 0 | 0 | 0 |
| P2 | 20 | 140 | 0 |
| P3 | 80 | 140 | 0 |
| P4 | 100 | 0 | 0 |
| P5 | 0 | 0 | 600 |
| P6 | 20 | 140 | 600 |
| P7 | 80 | 140 | 600 |
| P8 | 100 | 0 | 600 |

FIG. 3E

| LINE | TWO END POINTS |
|---|---|
| L1 | P1, P2 |
| L2 | P2, P3 |
| L3 | P3, P4 |
| L4 | P1, P4 |
| L5 | P2, P6 |
| L6 | P3, P7 |
| L7 | P4, P8 |
| L8 | P1, P5 |
| L9 | P5, P6 |
| L10 | P6, P7 |
| L11 | P7, P8 |
| L12 | P5, P8 |

FIG. 3F

| FACE | LINE SEGMENTS OF FACE | NORMAL LINE (x, y, z) |
|------|-----------------------|------------------------|
| S1   | L1, L2, L3, L4        | (0, 0, -1)             |
| S2   | L1, L5, L8, L9        | (-0.88, 0.12, 0)       |
| S3   | L2, L5, L6, L10       | (0, 1, 0)              |
| S4   | L3, L6, L7, L11       | (0.88, 0.12, 0)        |
| S5   | L4, L7, L8, L12       | (0, -1, 0)             |
| S6   | L9, L10, L11, L12     | (0, 0, 1)              |

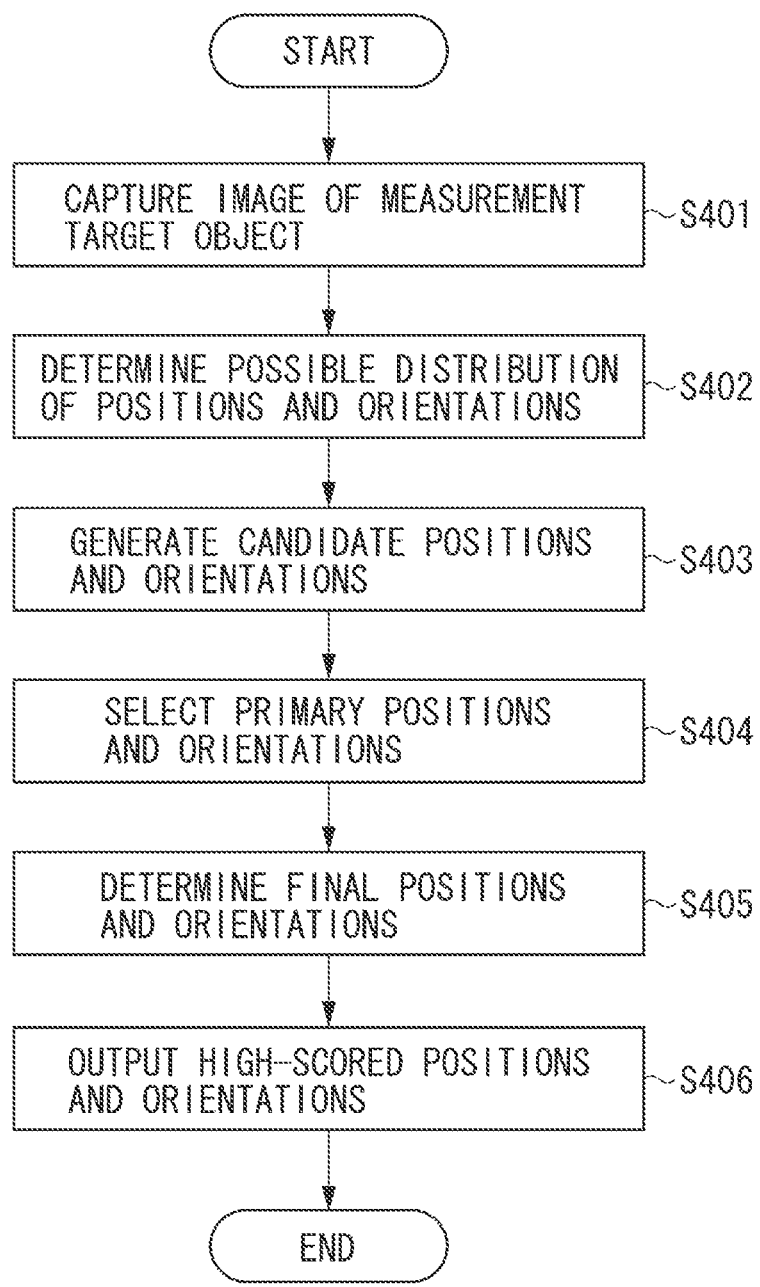

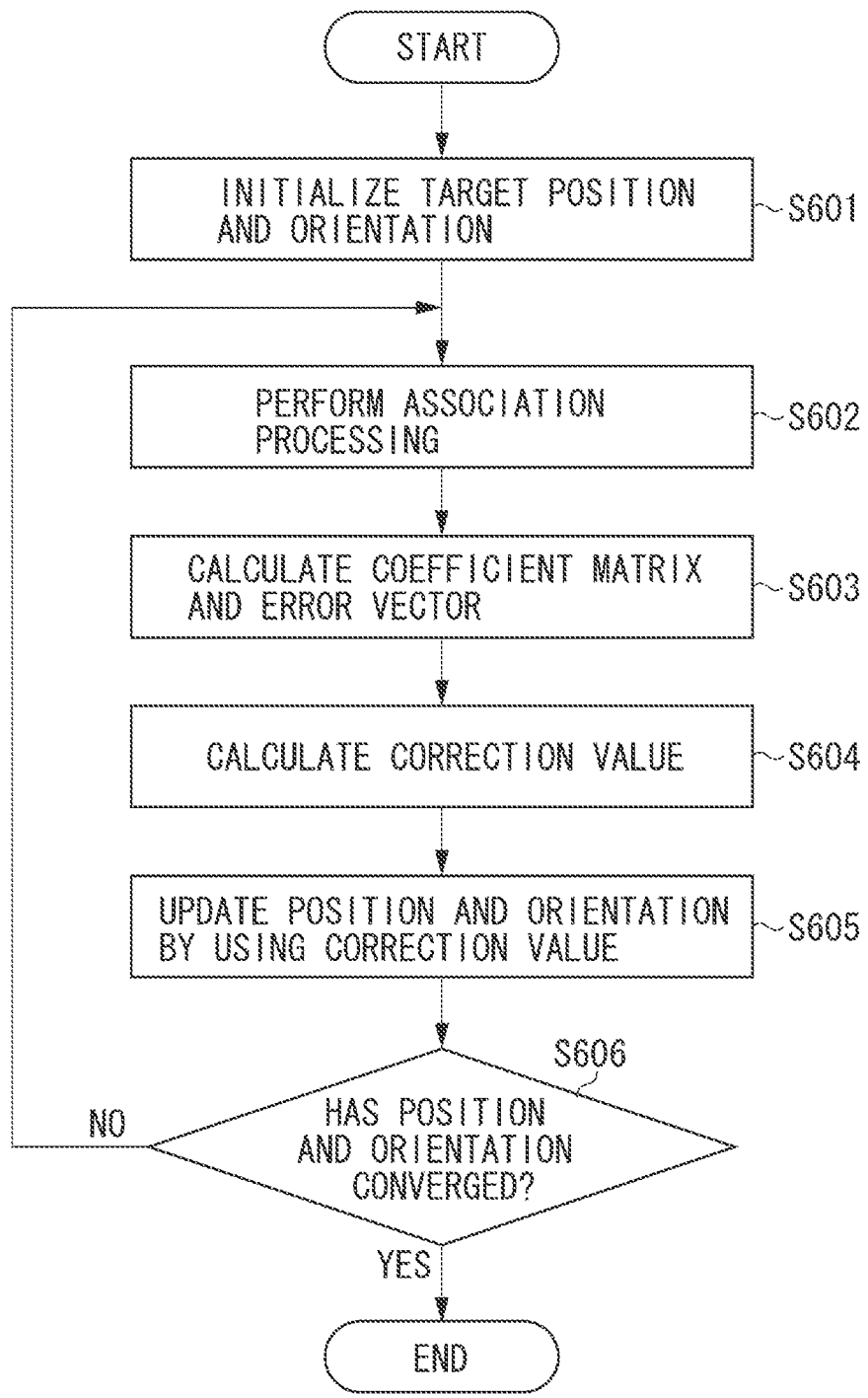

POSITION AND ORIENTATION MEASURING APPARATUS, INFORMATION PROCESSING APPARATUS AND INFORMATION PROCESSING METHOD

CROSS-REFERENCE TO RELATED APPLICATIONS

This application is a continuation, and claims the benefit, of U.S. patent application Ser. No. 14/173,741 filed Feb. 5, 2014 (now U.S. Pat. No. 9,704,248), which claims the benefit of Japanese Patent Applications No. 2013-022372 filed Feb. 7, 2013 and No. 2013-222526 filed Oct. 25, 2013. Each of U.S. patent application Ser. No. 14/173,741 and Japanese Patent Applications No. 2013-022372 and No. 2013-222526 is hereby incorporated by reference herein in its entirety.

BACKGROUND OF THE INVENTION

Field of the Invention

The present invention relates to a method useful for measurement of a position and orientation of an object of a known shape.

Description of the Related Art

In recent years, with increasing development of the computer vision, techniques that allow robots to perform complicated tasks are increasingly studied. Among the major examples of such tasks, there is the assembly of industrial products. When a robot autonomously performs an assembly work, an end effector, such as a hand, typically needs to hold the component (target object) to be assembled. Before holding the component, the robot captures an image of the actual environment by a camera. Then, by fitting model information of the target object to the captured image, the robot measures the position and orientation of the target object in the actual environment. Further, based on the obtained measurement result, the robot generates a movement plan and actually controls the actuator.

Further, the component to be assembled may have a complex shape and texture. Since robustness is required with respect to information fitting of model information to the actual environment for holding a component by a robot, various studies have been performed.

For example, Japanese Patent Application Laid-Open No. 2012-26974 discusses a method that assumes a position and orientation of a camera in a robust manner. According to this method, first, a plurality of initial positions and orientations is generated at a predetermined sampling interval in a possible range of the position and orientation of the camera. Then, the calculation of the fitting is performed for each initial position and orientation, and the position and orientation with the highest score is determined as the final position and orientation of the fitting.

However, the method discussed in Japanese Patent Application Laid-Open No. 2012-26974 is based on the assumption that the possible range of the position and orientation of the camera is determined in advance in an appropriate range. Thus, if this assumption is not satisfied, the position and orientation of the camera cannot be obtained in a robust manner.

SUMMARY OF THE INVENTION

According to an aspect of the present invention, a position and orientation measurement apparatus includes an acquisition unit configured to acquire, from an image including a target object, at least one coarse position and orientation of the target object, a generation unit configured to newly generate, based on the acquired coarse position and orientation, at least one candidate position and orientation as an initial value used for deriving a position and orientation of the target object, and a deriving unit configured to derive the position and orientation of the target object in the image by using model information of the target object and by performing at least once of fitting processing of the candidate position and orientation generated as the initial value with the target object in the image.

According to the present invention, a robust measurement of the position and orientation can be achieved.

Further features of the present invention will become apparent from the following description of exemplary embodiments with reference to the attached drawings.

BRIEF DESCRIPTION OF THE DRAWINGS

FIG. 2 is a block diagram illustrating a module configuration of a program.

FIGS. 3A to 3F illustrate configurations of three-dimensional model information.

FIG. 4 is a flowchart illustrating entire fitting processing procedure.

FIG. 6 is a flowchart illustrating a calculation procedure of a position and orientation.

DESCRIPTION OF THE EMBODIMENTS

Various exemplary embodiments, features, and aspects of the invention will be described in detail below with reference to the drawings. Each of the exemplary embodiments described below illustrates a specific example of the embodiments of the present invention.

According to a first exemplary embodiment, a luminance image and a distance image of a target object are simultaneously acquired by an imaging apparatus and a projection apparatus. Then, three-dimensional model information is fitted to the luminance image by the two-dimensional scale and fitted to the distance image by the three-dimensional scale. Further, the obtained result is simultaneously evaluated by the two-dimensional scale and the three-dimensional scale. According to the present exemplary embodiment, although the fitting is simultaneously performed by the two-dimensional scale as well as the three-dimensional scale, only the two-dimensional scale or only the three-dimensional scale can be similarly used in the present invention.

Regarding the setting of an initial position of the three-dimensional model information, a possible distribution of positions and orientations (distribution of coarse positions and orientations) is acquired according to a full search of the luminance image captured by the imaging apparatus. Then, a plurality of initial or candidate positions and orientations is generated based on the acquired distribution of the coarse positions and orientations. Further, the fitting is performed according to the candidate positions and orientations. Finally, the position and orientation that matched most is output as the final fitting result.

In this manner, the position and orientation, which can be a local solution, is comprehensively verified and the robustness of the fitting can be improved. Details of the processing procedure will be described below. In the following descriptions of all the exemplary embodiments according to the present invention, unless specified otherwise, fitting means fitting a two-dimensional or a three-dimensional geometric model of a measurement target object to a position or a position and orientation of the measurement target object in an image.

Figure 1:
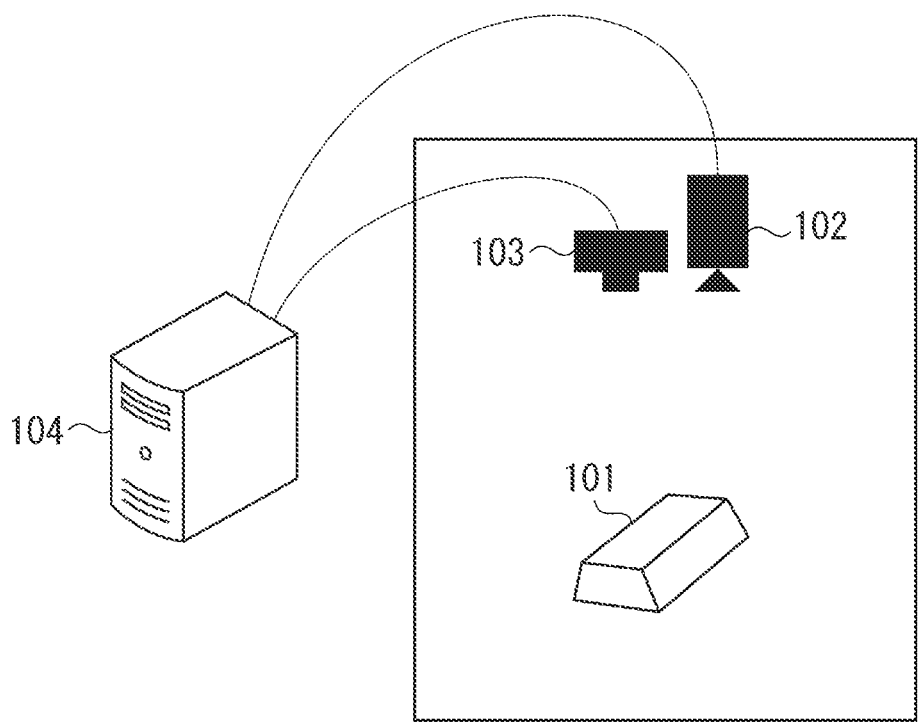
FIG. 1 illustrates a configuration of a system according to a first to a seventh exemplary embodiment of the present invention.

FIG. 1 illustrates a system configuration of a position and orientation measurement apparatus according to the first exemplary embodiment.

A measurement target object 101 is a target object of the measurement of the position and orientation. According to the present exemplary embodiment, as illustrated in FIG. 1, one measurement target object 101 is provided in order to simplify the description. However, the position and orientation measurement processing described below does not largely depend on the shape, the number, or the piled-up state of the measurement target object. For example, the present invention is useful in measuring a position and orientation of an object among a stack of mixed objects to be measured with different shapes.

A projection apparatus 102 projects a pattern light on the measurement target object 101. The projection apparatus 102 will be described in detail below.

An imaging apparatus 103 captures a still image or a moving image. According to the present exemplary embodiment, the imaging apparatus 103 performs imaging of the measurement target object 101 with or without a pattern light projected thereon by the projection apparatus 102. When the imaging is finished, the imaging apparatus 103 transmits the captured image to a position and orientation measurement apparatus 104. The imaging apparatus 103 is described in detail below.

The position and orientation measurement apparatus 104 is connected to the projection apparatus 102 and the imaging apparatus 103. In addition to controlling the operation of the projection apparatus 102 and the imaging apparatus 103, the position and orientation measurement apparatus 104 obtains the position and orientation of the measurement target object 101 by using the image captured by the imaging apparatus 103. Further, the position and orientation measurement apparatus 104 is configured to perform the process illustrated in FIG. 2, for example as a program or software running on a processor or in a circuit. A three-dimensional model information storing unit 202 corresponds to a storage device, such as a hard disk or a memory, provided inside or outside of the position and orientation measurement apparatus 104. For example, the three-dimensional model information storing unit 202 can be included in a hard disk and a computer-executable program causing a central processing unit (CPU) to execute a function of each unit of the position and orientation measurement apparatus 104 other than the three-dimensional model information storing unit 202 can also be stored in the hard disk. Then, the CPU of the position and orientation measurement apparatus 104 reads out the computer-executable program or data stored in the hard disk, loads it to a random access memory (RAM), and executes processing by using the computer-executable program or the data read out from the hard disk. A common personal computer (PC) can be used as the position and orientation measurement apparatus 104. Further, the position and orientation measurement apparatus 104 controls the operation of the projection apparatus 102 and the imaging apparatus 103 via a common communication interface based on RS-232C or IEEE 488. Imaging timing of the imaging apparatus 103 is controlled by the position and orientation measurement apparatus 104.

Next, a configuration example of the functions of the position and orientation measurement apparatus 104 will be described with reference to the block diagram in FIG. 2.

The three-dimensional model information storing unit 202 stores a three-dimensional computer aided design (CAD) model which can be dealt with by three-dimensional CAD software or shape information of the measurement target object. The shape information is obtained by converting the three-dimensional CAD model into a plurality of polygon elements used in computer graphics. According to the present exemplary embodiment, the CAD model is a three-dimensional geometric model simulating the shape of the measurement target object 101 using polygon elements. The configuration of the three-dimensional model information will be described below with reference to FIG. 3.

Figure 3A:
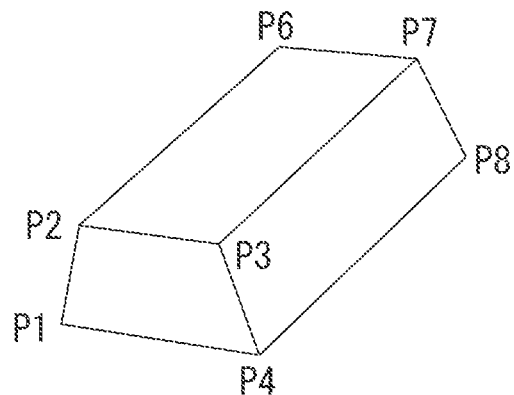
Figure 3B:
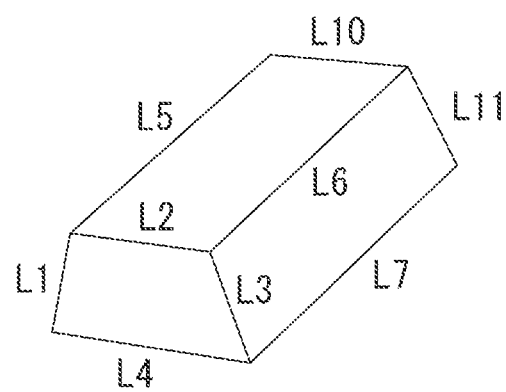
Figure 3C:
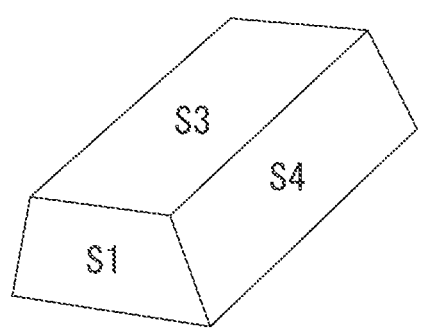

The three-dimensional geometric model formed by polygon elements includes points, lines, and faces as illustrated in FIGS. 3A to 3C. Each of FIGS. 3A to 3C illustrates a same three-dimensional geometric model.

According to model information of a three-dimensional geometric model formed by polygon elements, each vertex of the three-dimensional geometric model illustrated in FIG. 3A is managed by an index of the vertex as well as three-dimensional coordinate values of the vertex as illustrated in FIG. 3D.

Further, according to this model information, each side of the three-dimensional geometric model illustrated in FIG. 3B is managed by an index of the side as well as the vertices of the ends of the side as illustrated in FIG. 3E.

Furthermore, according to this model information, each face (polygon) of the three-dimensional geometric model illustrated in FIG. 3C is managed by an index of the polygon, line segments that form the polygon, and normal vectors of the polygon as illustrated in FIG. 3F.

Such three-dimensional model information storing unit 202 is stored in a certain memory in the position and orientation measurement apparatus 104 or in an external memory accessible by the position and orientation measurement apparatus 104.

A coarse position and orientation acquisition unit 203 acquires the image of the measurement target object 101 which has been captured by the imaging apparatus 103. This image of the measurement target object 101 has a pattern projected by the projection apparatus 102, in this embodiment. Then, the coarse position and orientation acquisition unit 203 acquires a possible position and orientation (coarse position and orientation) of the measurement target object 101 from the acquired captured image. The specific method is described below.

A candidate position and orientation generation unit 204 generates a plurality of candidate positions and orientations based on the distribution of the coarse positions and orientations obtained by the coarse position and orientation acquisition unit 203. The method for generating the candidate positions and orientations will be described below.

From among a plurality of candidate positions and orientations, a candidate position and orientation selection unit 205 selects one or more candidate positions and orientations as initial values for fitting calculation of the position and orientation. By screening the plurality of candidate positions and orientations, the calculation time can be reduced. The method for selecting the candidate positions and orientations will be described below.

A position and orientation calculation unit 206 fits the three-dimensional model to the luminance image and the distance image obtained by the imaging apparatus 103 using the position and orientation of the candidate position and orientation selected by the candidate position orientation selection unit 205. Then, the position and orientation calculation unit 206 calculates the final position and orientation.

The imaging apparatus 103 is a camera and captures an image of the work space where the measurement target object 101 is provided. In the description of the present invention, a "coordinate system" and a "position and orientation" without a modifying word suggest a "coordinate system" of the camera and a "position and orientation" in the coordinate system of the camera, respectively. On the other hand, a "model coordinate system" suggests a coordinate system defined for each model used for expressing the position of a vertex or a face of the three-dimensional model of the component. Internal parameters of the camera, such as the focal length, principal point position, and lens distortion parameter, are to be calibrated in advance by a method, for example, discussed in "A flexible new technique for camera calibration" IEEE Transaction Pattern Analysis and Machine Intelligence, vol. 22, no. 11, pp. 1330-1334, 2000, Z. Zhang.

The projection apparatus 102 projects a pattern light by a liquid crystal projector. Internal parameters of the projector, such as the focal length, principal point position, and lens distortion parameter, are to be calibrated in advance by a method similar to the one used for the calibration of the camera. The projection apparatus 102 is not limited to a liquid crystal projector and can be a projector of a different type so long as it can project a pattern light. For example, it can be a projector using a digital mirror device (DMD) or a liquid crystal on silicon (LCOS).

The position and orientation measurement apparatus 104 controls the projection apparatus 102 and the imaging apparatus 103 to obtain a luminance image and a distance image of the measurement target object.

The luminance image and the distance image are obtained, for example, as described below. First, when the position and orientation measurement apparatus 104 obtains a luminance image, the position and orientation measurement apparatus 104 generates a predetermined pattern and transmits data of the projection pattern to the projection apparatus 102 via, for example, a general purpose display interface such as Digital Visual Interface (DVI). Further, the position and orientation measurement apparatus 104 controls the operation of the projection apparatus 102 via a general purpose communication interface such as RS-232C or IEEE 488. Then, according to the control by the position and orientation measurement apparatus 104, the projection apparatus 102 displays the pattern on the display device based on the transmitted data of the projection pattern. The pattern which is projected is, for example, a full ON pattern, a full OFF pattern, a gray code used in space coding, or a sine wave pattern using phase shifting.

The position and orientation measurement apparatus 104 obtains the image of the measurement target object 101 having the pattern projected thereon and captured by the imaging apparatus 103, from the imaging apparatus 103. In other words, the position and orientation measurement apparatus 104 obtains a digital image signal which has been obtained according to sampling and quantization performed by the imaging apparatus 103. Further, the position and orientation measurement apparatus 104 obtains image data expressed in a luminance (density value) of each pixel from the obtained image signal and stores the obtained image data in the memory.

The distance image is generated by using a principle of triangulation based on a shape of a pattern light in the captured image. This method is generally called active stereo. The method for obtaining the distance image is not limited to the active stereo and a different method such as passive stereo can also be used in realizing the embodiments of the present invention.

FIG. 4 is a flowchart illustrating a procedure of the fitting processing of the information processing apparatus described above. The flowchart illustrates an outline of the processing procedure. Processing which is especially important will be described in detail with reference to other drawings.

In step S401, the CPU of the position and orientation measurement apparatus 104 instructs the imaging apparatus 103 to capture an image of the measurement target object 101 in the work space and obtains a luminance image and a distance image of the measurement target object 101.

In step S402, the CPU of the position and orientation measurement apparatus 104 performs a full search of the luminance image for a plurality of coarse positions and orientations of the measurement target object 101 and determines a possible distribution of the positions and orientations. The technique which uses a full search of an image for obtaining the coarse positions and orientations of a measurement target object in the image is commonly used. For example, a method for calculating a position and orientation in an image of a three-dimensional model of an object using pattern matching is discussed in non-patent literature "Detection and Pose Estimation of Piled Objects using Ensemble of Tree Classifiers", Hiroto Yoshii, Meeting of Image Recognition and Understanding (MIRU 2010), 2010.

According to such a method, pattern matching is performed a plurality of times in the image. The result obtained from one matching process is recorded as one "vote". When all the pattern matching is finished, the voting results are compiled and presented as a result of the full search. The result obtained from one vote includes information of six parameters of the position and orientation of the measurement target object. Actually, however, in order to streamline the calculation, the parameters associated with the two-dimensional or the three-dimensional scale may be classified and represented by a representative value. According to the present invention, a plurality of votes each with six parameters of the position and orientation is used as a possible distribution of the positions and orientations of the target component.

Figure 5A:
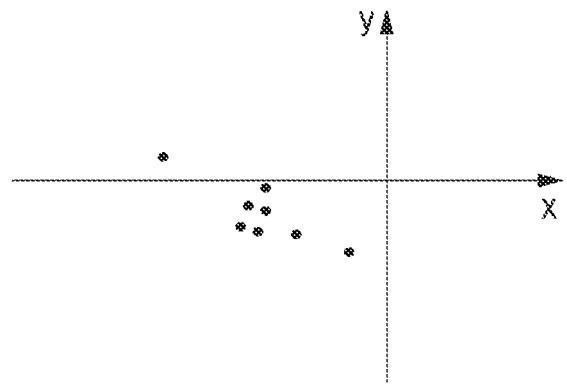
FIGS. 5A to 5C illustrate a method for generating a candidate position and orientation from a distribution of coarse positions and orientations.

FIG. 5A illustrates an example of the distribution of the coarse positions and orientations obtained in this manner. According to the present exemplary embodiment, although the position and orientation is expressed by two parameters (x, y) for simplification, six parameters of the position and orientation can be used for the actual fitting.

Further, the image which is used for the method for searching the position and orientation of a particular component in the image according to the present exemplary embodiment is not limited to the luminance image. In other words, three-dimensional information such as the distance image can also be used in searching the position and orientation of the component.

Further, although the full search is used for obtaining the distribution of the coarse positions and orientations in the description above, it is not always necessary to perform the full search of the image according to the present invention. For example, if a component is consistently placed at a substantially same place in the work area, it is possible to use the partial search of only that area.

In step S403, the CPU of the position and orientation measurement apparatus 104 generates a predetermined number of candidate positions and orientations based on the distribution of the coarse positions and orientations obtained in step S402.

Figure 5B:
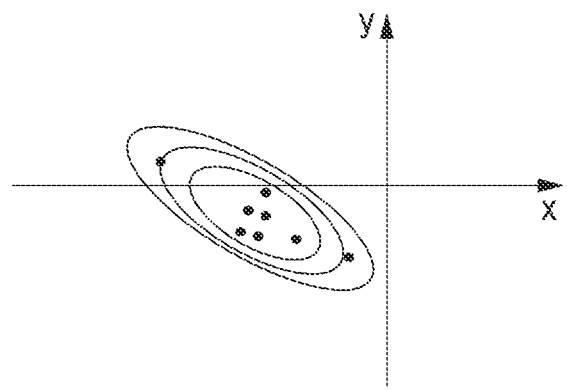

First, the CPU calculates a mean vector p and a covariance matrix $\Sigma$ based on the distribution of the coarse positions and orientations and applies the Gaussian distribution. FIG. 5B illustrates a distribution chart created by the CPU. In FIG. 5B, the contour lines obtained by plotting the probability density of the two-dimensional Gaussian distribution is added to the distribution of the coarse positions and orientations illustrated in FIG. 5A.

Figure 5C:
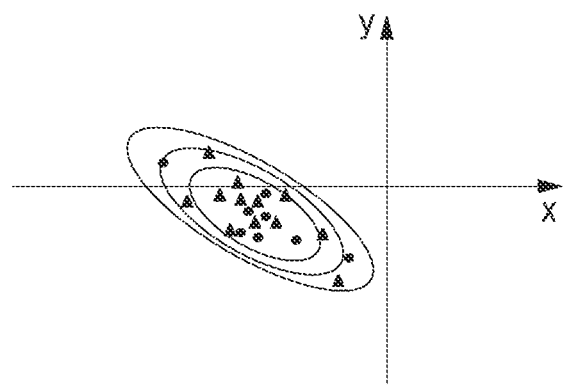

Next, according to the obtained Gaussian distribution, the CPU generates a predetermined number of candidate positions and orientations. The predetermined number is a number obtained by performing inverse operation of the permissible time necessary for the system. FIG. 5C illustrates the candidate positions and orientations generated in this manner. Methods for generating sample data points based on known probability density distributions are known in the art, and any suitable technique may be employed.

In the example in FIG. 5C, a total number of the coarse positions and orientations obtained in step S402 (plotted as black dots in FIG. 5C) and the newly generated candidate positions and orientations (plotted as black triangles in FIG. 5C) is set to 20. The twenty points are the initial positions and orientations.

According to the present exemplary embodiment, since the position and orientations which are set as the coarse positions and orientations are considered to have certain reasonability, they are employed as the candidate positions and orientations. However, according to the present exemplary embodiment, only the newly-generated positions and orientations may be employed as the candidate positions and orientations.

Although the Gaussian distribution is used as the probability density model, actually, other distribution (predetermined distribution function) may be used as the probability density model so long as it can summarize the distribution of the obtained coarse positions and orientations. Further, a squared distribution may also be used.

In step S404, from a plurality of candidate positions and orientations obtained in step S403, the CPU of the position and orientation measurement apparatus 104 selects the candidate positions and orientations of a predetermined number (one or more) with a high score. The score represents a matching rate of the three-dimensional model with the luminance image and the distance image. More particularly, the CPU performs the position and orientation update processing of the position and orientation calculation processing (described below with reference to steps S601 to S606 in FIG. 6) once. Then, the CPU compares the candidate positions and orientations and sorts them in the order of high scores. Further, the CPU extracts the top-ranked predetermined number of candidate positions and orientations.

By performing the position and orientation calculation processing that requires repetitive processing for only the candidate positions and orientations which have been selected, the total fitting time can be reduced. The predetermined number of the candidate positions and orientations is set by the CPU performing inverse operation of the permissible time required for the system. Further, any value may be used as the score so long as it can express a matching degree of the three-dimensional model and the luminance image or the distance image.

For example, a method that obtains an error vector (described below) between the three-dimensional model and the luminance image or the distance image and uses the reciprocal of the norm can be used. Further explanation of the error vector is provided below in relation to step S603 of FIG. 6. However, a different index can also be used. According to the selection processing described above, before the candidate positions and orientations are evaluated by using the score, the position and orientation update processing in steps S601 to S606 is performed once (associate once). However, the number of times of such processing being performed is not limited to once, and the method is not limited so long as an appropriate initial position and orientation is determined at a high speed and in an appropriate (reasonable) manner.

For example, the score may be calculated without updating the position and orientation or the score may be calculated after updating the position and orientation update twice or more. There are a number of methods which can be used as the actual procedure of the selection processing. The method of the selection processing of the present invention is not limited to a particular method.

In step S405, the CPU of the position and orientation measurement apparatus 104 determines a final position and orientation for each of one or more candidate positions and orientations of the predetermined number selected in step S404. Details of the position and orientation calculation processing will be described below with reference to FIG. 6. FIG. 6 is a flowchart illustrating detailed procedure of the position and orientation calculation processing of one initial position and orientation illustrated in step S405.

According to the present exemplary embodiment, the position and orientation is calculated by repeatedly correcting a candidate position and orientation (hereinafter expressed as "s") of the measurement target object by iterative operation using the Gauss-Newton method. According to the present exemplary embodiment, based on a position and orientation assumed as an edge in the image, and based on a distance from the edge of the three-dimensional model projected on the image, each point of the point group data of the distance image and a position and orientation, the position and orientation is optimized so that the sum of the distances between the face which is converted into a coordinate system of a three-dimensional measurement apparatus is minimized.

More precisely, each of a signed distance between a point and a straight line in a two-dimensional image and a signed distance between a point and a plane in a three-dimensional space are expressed as a linear function of a minor change of the position and orientation of the component by the linear Taylor expansion. Then, by making and solving a linear simultaneous equation regarding the minor change of the position and orientation where the signed distance is 0, the correction of the position and orientation of the component is repeated for the minor change of the position and orientation.

In step S601, the CPU of the position and orientation measurement apparatus 104 performs initialization. More precisely, the CPU sets the candidate positions and orientations selected in step S404 as the initial values of the positions and orientations hereinafter referred to as "current positions and orientations".

In step S602, the CPU of the position and orientation measurement apparatus 104 performs association processing. First, based on the current positions and orientations, the CPU projects each edge of the three-dimensional model to the image and performs coordinate conversion of each face to the coordinate system of the three-dimensional measurement apparatus. Then, the CPU performs the association of the edge and the point group data.

Figure 7A:
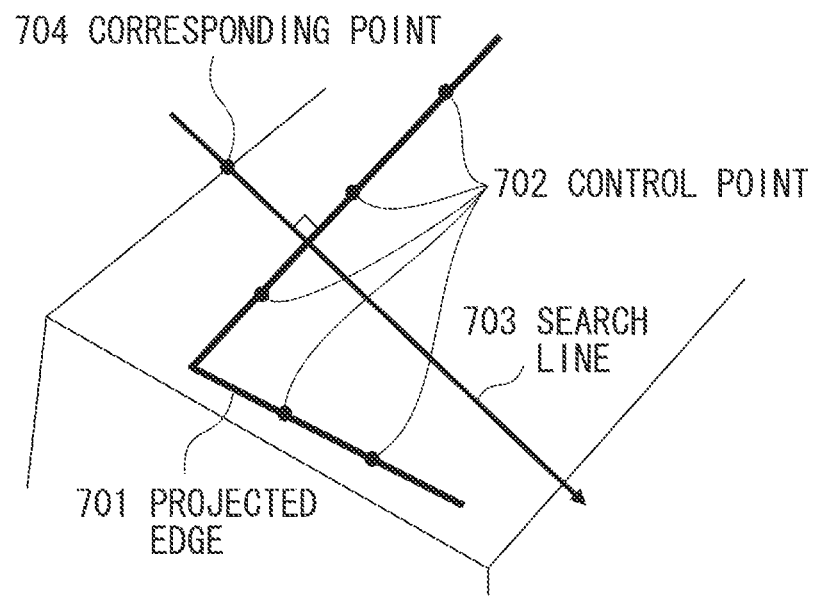
FIGS. 7A and 7B illustrate how to search a corresponding point.
Figure 7B:
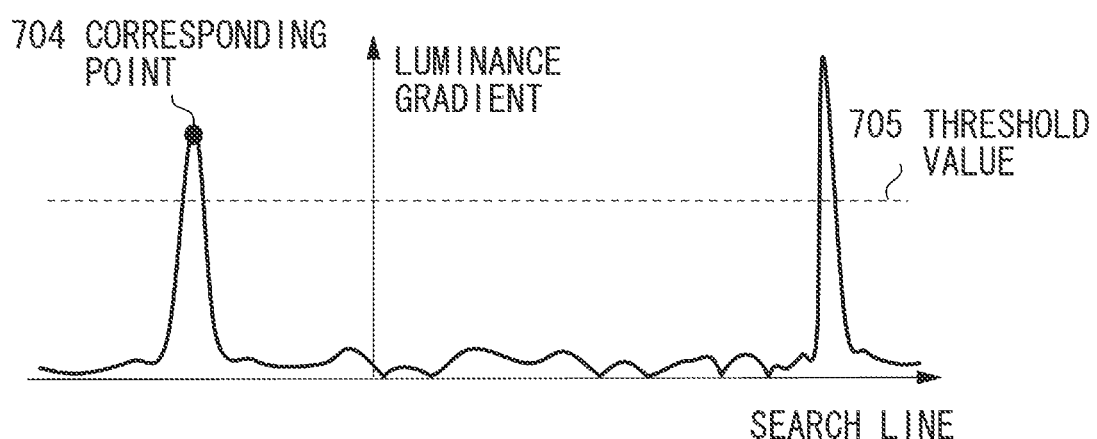

FIGS. 7A and 7B illustrate a fitting method of an edge.

FIG. 7A illustrates an edge of a three-dimensional model projected on a luminance image. First, a plurality of control points 702 is set at regular intervals on an edge 701 which has been projected. Then, a search line 703 is drawn in the normal direction of the edge 701 which has been projected for each of the control points 702. Further, within a predetermined range of the search line 703 having one of the control points 702 as a point of origin, one-dimensional edge detection is performed. Then, the point which is closest to the control point out of the detected edges is stored as a corresponding point 704.

FIG. 7B is a graph having the control point as the point of origin. The horizontal axis of the graph represents the search line and the vertical axis represents the absolute value of the luminance gradient. The edge is detected as an extreme value of an absolute value of a luminance gradient of a pixel value in the image. In FIG. 7B, a point having the extreme value of the absolute value of the luminance gradient greater than a predetermined threshold value 705 and closest to the control point is set as a corresponding point 704.

Next, the CPU of the position and orientation measurement apparatus 104 performs the association processing between the point group data and a face of the model. In other words, the CPU searches for a point in the range image which is closest to each point on the face of the model in the three-dimensional space and performs association processing.

In step S603, the CPU of the position and orientation measurement apparatus 104 calculates a coefficient matrix and an error vector used for solving a linear simultaneous equation. According to the present exemplary embodiment, each element of the coefficient matrix is a linear partial derivative of a minor change of the position and orientation. A partial derivative of the image coordinate is calculated for the edge and a partial derivative of the three-dimensional coordinate is calculated for the point group. Regarding the error vector, as for the edge, it is a distance between a projected edge and the detected edge in the image. As for the point group data, it is a distance between a point in the range image and a point on a face of a model in the three-dimensional space.

Figure 8:
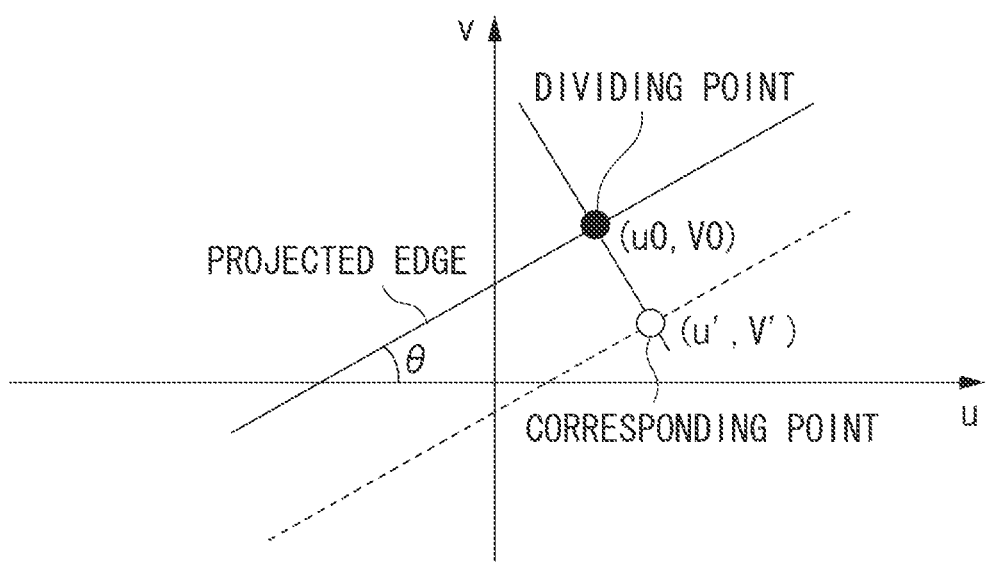
FIG. 8 illustrates a relation between a projected image of an edge and a detected edge.

FIG. 8 illustrates a relation between a projected image of an edge and a detected edge. In FIG. 8, the horizontal and vertical directions of the image are represented by u and v axes, respectively. A control point, which is obtained by dividing each edge projected at regular intervals in the image, is expressed as a point $(u_0, v_0)$ and the tilt of the edge to which the control point belongs in the image is expressed as a tilt $\theta$ with respect to the u axis. The tilt $\theta$ is calculated as a tilt of the straight line obtained by projecting the three-dimensional coordinates of the both ends of the edge on the image based on "s" and connecting the coordinates of the both ends in the image. The normal vector of the edge in the image will be $(\sin \theta, -\cos \theta)$. Further, the coordinates of the corresponding point of the control point is set as $(u', v')$. A point $(u, v)$ on the straight line through the point $(u', v')$ with the tilt $\theta$ is expressed as $$u \sin \theta - v \cos \theta = d \qquad \text{Formula 1}$$

where 0 is a constant and where $$d = u' \sin \theta - v' \cos \theta. \qquad \text{Formula 2}$$

The position of the control point in the image changes according to the position and orientation of the measurement target object. Further, the degree of freedom of the position and orientation of the measurement target object is 6 degrees. In other words, is a six-dimensional vector and is made of three elements that represent the position and three elements that represent the orientation of the measurement target object. The three elements that represent the orientation can be expressed by, for example, an Euler angle or a three-dimensional vector. The direction of the three-dimensional vector expresses the rotation axis and the size expresses the rotation angle. The point $(u, v)$ of a control point that changes according to the position and orientation can be approximated by the linear Taylor expansion in the vicinity of the point $(u_0, v_0)$ such as expressed by the formula 3. $\Delta s_i$ (i=1, 2, ... 6) expresses a minor change of each component of "s".

$$u \approx u_0 + \sum_{i=1}^{6} \frac{\partial u}{\partial s_i} \Delta s_i \qquad \text{Formula 3}$$

$$v \approx v_0 + \sum_{i=1}^{6} \frac{\partial v}{\partial s_i} \Delta s_i$$

The position of the control point in the image obtained by the correct "s" is assumed to be on the straight line expressed by the formula 1. By substituting u and v approximated by the formula 3 for the formula 1, formula 4 is obtained.

$$\sin\theta \sum_{i=1}^{6} \frac{\partial u}{\partial s_i} \Delta s_i - \cos\theta \sum_{i=1}^{6} \frac{\partial v}{\partial s_i} \Delta s_i = d - r \qquad \text{Formula 4}$$

where $$r = u_0 \sin\theta - v_0 \cos\theta \qquad \text{Formula 5}$$

r is a constant.

A three-dimensional coordinates in a coordinate system of a three-dimensional measurement apparatus can be converted into a three-dimensional coordinates (x, y, z) in a model coordinate system by the position and orientation "s" of the component to be measured. If a point is converted into a point $(x_0, y_0, z_0)$ in a model coordinate system according to the coarse position and orientation, since the three-dimensional coordinate (x, y, z) changes according to the position and orientation of the measurement target object, it can be approximated by the linear Taylor expansion in the vicinity of the point $(x_0, y_0, z_0)$ as expressed by formula 6.

$$x \approx x_0 + \sum_{i=1}^{6} \frac{\partial x}{\partial s_i} \Delta s_i$$

$$y \approx y_0 + \sum_{i=1}^{6} \frac{\partial y}{\partial s_i} \Delta s_i$$

$$z \approx z_0 + \sum_{i=1}^{6} \frac{\partial z}{\partial s_i} \Delta s_i$$

Formula 6

In step S602, where an equation in a model coordinate system is ax+by +cz=e ($a^2+b^2+c^2=1$, where a, b, c, and e are constants) of a face of a three-dimensional model associated with a point in the point group data, (x, y, z) converted by the correct "s" is assumed to satisfy an equation of a plane ax+by +cz=e($a^2+b^2-c_2=1$), by substituting the formula 6 for the equation of the plane, formula 7 is obtained.

$$a\sum_{i=1}^{6} \frac{\partial x}{\partial s_i}\Delta s_i + b\sum_{i=1}^{6} \frac{\partial y}{\partial s_i}\Delta s_i + c\sum_{i=1}^{6} \frac{\partial z}{\partial s_i}\Delta s_i = e - q$$

Formula 7 where $$q = ax_0 + by_0 + cz_0$$

Formula 8 is a constant.

The formula 6 holds true for all the edges which have been subjected to the fitting in step S602. Further, since the formula 7 holds true for all the point group data which has been associated in step S602, a linear simultaneous equation regarding $\Delta s_i$ such as formula 9 can hold.

$$\begin{bmatrix} \sin\theta_1 \frac{\partial u_1}{\partial s_1} - \cos\theta_1 \frac{\partial v_1}{\partial s_1} & \sin\theta_1 \frac{\partial u_1}{\partial s_2} - \cos\theta_1 \frac{\partial v_1}{\partial s_2} & \cdots & \sin\theta_1 \frac{\partial u_1}{\partial s_6} - \cos\theta_1 \frac{\partial v_1}{\partial s_6} \\ \sin\theta_2 \frac{\partial u_2}{\partial s_1} - \cos\theta_1 \frac{\partial v_2}{\partial s_1} & \sin\theta_2 \frac{\partial u_2}{\partial s_2} - \cos\theta_1 \frac{\partial v_2}{\partial s_2} & \cdots & in\theta_2 \frac{\partial u_1}{\partial s_6} - \cos\theta_1 \frac{\partial v_2}{\partial s_6} \\ \vdots & \vdots & \ddots & \vdots \\ a_1\frac{\partial x_1}{\partial s_1}+b_1\frac{\partial y_1}{\partial s_1}+c_1\frac{\partial z_1}{\partial s_1} & a_1\frac{\partial x_1}{\partial s_2}+b_1\frac{\partial y_1}{\partial s_2}+c_1\frac{\partial z_1}{\partial s_2} & \cdots & a_1\frac{\partial x_1}{\partial s_6}+b_1\frac{\partial y_1}{\partial s_6}+c_1\frac{\partial z_1}{\partial s_6} \\ a_2\frac{\partial x_2}{\partial s_1}+b_2\frac{\partial y_2}{\partial s_1}+c_2\frac{\partial z_2}{\partial s_1} & a_2\frac{\partial x_2}{\partial s_2}+b_2\frac{\partial y_2}{\partial s_2}+c_2\frac{\partial z_2}{\partial s_2} & \cdots & a_2\frac{\partial x_2}{\partial s_6}+b_2\frac{\partial y_2}{\partial s_6}+c_2\frac{\partial z_2}{\partial s_6} \\ \vdots & \vdots & \vdots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \\ e_1 - q_1 \\ e_2 - q_2 \\ \vdots \end{bmatrix}$$

Formula 9 where the formula 9 is expressed as in formula 10.

$$J\Delta s = E$$

Formula 10

The calculation of the partial derivative used for calculating a coefficient matrix J of the linear simultaneous equation in the formula 9 is, for example, performed according to a method discussed in V. Lepetit and P. Fua, "Keypoint recognition using randomized trees" IEEE Transactions on Pattern Analysis and Machine Intelligence, vol. 28, no. 9, 2006.

In step S604, the CPU of the position and orientation measurement apparatus 104 obtains $\Delta s$ by using a pseudo-inverse matrix $(J^T \cdot J)^{-1} \cdot J^T$ of the matrix J based on the formula 10. However, since the edge and the point group data include a lot of outliers due to false detection, a robust estimation method described below is used. Generally, an error d-r (e-q) becomes larger for an edge (point group data) being an outlier. Thus, the contribution ratio with respect to the simultaneous equations of the formulas 9 and 10 becomes larger and the accuracy of $\Delta s$, which is obtained as a result, will be reduced.

Thus, a small weighting is given to data with a large error d-r (e-q) whereas a large weighting is given to data with a small error d-r (e-q). The weighting is, for example, obtained by Tukey function illustrated in formula 11.

$$w(d-r) = \begin{cases} (1-((d-r)/c_1)^2)^2 & |d-r| \leq c_1 \\ 0 & |d\ r| > c_1 \end{cases}$$

$$w(e-q) = \begin{cases} (1-((e-q)/c_2)^2)^2 & |e-q| \leq c_2 \\ 0 & |e-q| > c_2 \end{cases}$$

Formula 11

In formula 11, $c_1$, $c_2$ are constants. Further, the function that gives weighting is not necessarily the Tukey function. In other words, any function can be used so long as it can give a smaller weighting to the data with a large error and larger weighting to the data with a small error such as the Huber function.

Where the weighting that corresponds to each piece of data (edge or point group data) is a weighting $w_i$, a weighting matrix W is defined as expressed in formula 12.

$$W = \begin{bmatrix} w_1 & & & 0 \\ & w_2 & & \\ & & \ddots & \\ 0 & & & w_{N_c} \end{bmatrix}$$

Formula 12

The weighting matrix W is a square matrix of 0 except for the diagonal component. The weighting $w_i$ is used for the diagonal component. By using the weighting matrix W, the formula 10 is modified to formula 13.

$$WJ\Delta s = WE$$

Formula 13

The correction value $\Delta s$ is obtained by solving the formula 13 as expressed in formula 14.

$$\Delta s = (J^T W J)^{-1} J^T W E$$

Formula 14

In step S605, the CPU of the position and orientation measurement apparatus 104 updates the position and orientation by using the correction value Δs for the position and orientation calculated in step S604.

In step S606, the CPU of the position and orientation measurement apparatus 104 determines whether the position and orientation has converged. If the CPU determines that the position and orientation has converged (YES in step S606), then the position and orientation is set as a result of the fitting, and the processing ends. If the CPU determines that the position and orientation has not yet converged (NO in step S606), the processing returns to step S602 and the processing in steps S602 to S605 is performed again until the position and orientation is converged. Regarding the convergence determination, the CPU determines that the position and orientation has converged when the correction value used in step S605 is equal to or less than a predetermined value and can be considered as showing substantially no change. The converge determination method is not limited to the above-described method. For example, after the processing is repeated a predetermined number of times, the processing may proceed to the next step as it can be considered that the position and orientation has converged.

In step S406, the CPU compares the calculation results of the scores of a predetermined number (one or more) of the positions and orientations obtained in step S405 and outputs one or more positions and orientations with a high score as a final fitting result. The score is the index similar to the one described in step S404.

According to the present exemplary embodiment, from the result obtained from the full search in the image of the measurement target object, the distribution of the coarse positions and orientations of the measurement target object is determined. Then, by comprehensively verifying a plurality of candidate positions and orientations which can be the local solution based on the distribution, a robust position and orientation measurement can be performed even if the environment includes a lot of noise or the target object has a complex shape.

The calculation method of the position and orientation of the measurement target object according to the present invention is not necessarily the Gauss-Newton method. For example, the Levenberg-Marquardt algorithm, which is more robust with respect to the calculation, or the method of steepest descent, which is a simpler method, can be used. Further, a different nonlinear optimization calculation method such as a conjugate gradient method or an incomplete Cholesky-conjugate gradient (ICCG) method may also be used.

According to the present exemplary embodiment, although the position and orientation measurement apparatus 104 acquires the captured image directly from the imaging apparatus 103, the method for obtaining the captured image is not limited to such an example. For example, the captured image may be acquired from the memory that stores the images captured by the imaging apparatus 103. In this case, the imaging apparatus 103 is not necessarily connected to the position and orientation measurement apparatus 104.

According to the present exemplary embodiment, a combination of the three-dimensional model information of the measurement target object and an image including the component captured by the imaging apparatus is described as a combination of the shape information for the fitting. However, the combination of the shape information is not limited to such an example. In other words, any information can be used so long as it allows the association of the shape information. As an example of the shape information of the object, three-dimensional point group information obtained by measurement by a laser range sensor may be used in addition to the three-dimensional model information and the image.

According to the first exemplary embodiment, the candidate position and orientation is generated from the distribution of the coarse positions and orientations of the measurement target object using the multidimensional Gaussian distribution. However, the candidate position and orientation can be generated without using the probability density model such as the Gaussian distribution.

As an example of such a method, according to a second exemplary embodiment of the present invention, the distribution of the coarse positions and orientations is collected in the context of a predetermined sampling interval. Then, the candidate position and orientation is generated based on the obtained result. The processing described below replaces step S403 in FIG. 4 by which the distribution of the positions and orientations is determined according to the first exemplary embodiment.

Figure 9A:
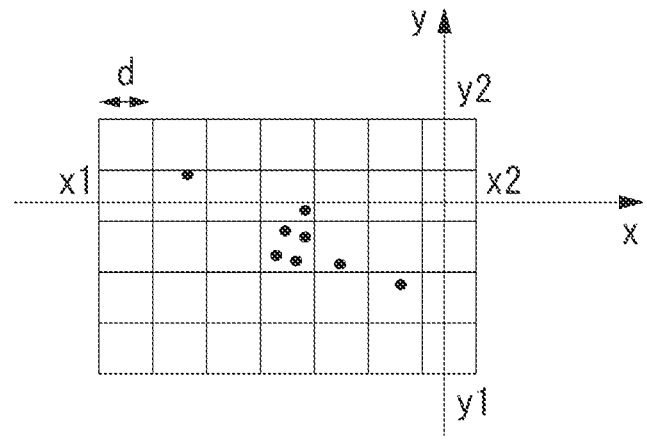
FIGS. 9A, 9B, and 9C illustrate a method for generating an initial position and orientation by correcting the possible distribution of the position and orientation.

First, a range where the distribution of the positions and orientations is summed up is determined. FIG. 9A illustrates a range of the captured image with the distribution of the positions and orientations illustrated in FIG. 5A in sampling bins of x1 to x2 and y1 to y2. A width "d" of the bin is a constant set in advance. For example, it can be a value which is obtained by dividing a long side of the measurement target object by a predetermined value. In the description below, a case where the length of the long side of the measurement target object is 50 mm, the predetermined value is 10, and the width "d" is 5 mm obtained by dividing 50 by 10 will be described. Further, for example, the width "d" may be obtained by dividing not the long side of the measurement target object but by dividing the imaging range by a predetermined number.

Figure 9B:
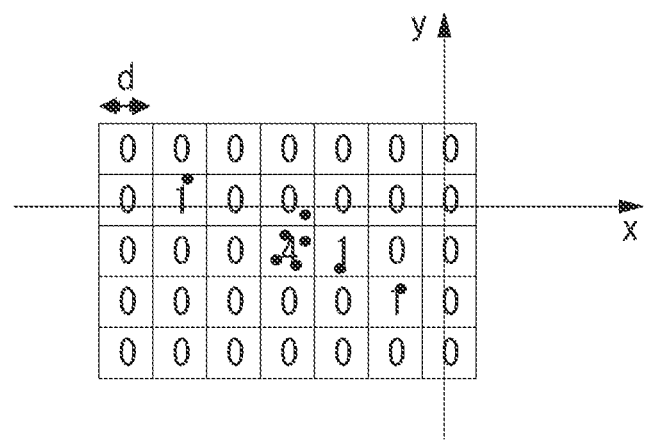

Next, the number of the positions and orientations in the range where the above-described bin has been set is summed up. In FIG. 9B, the number of the positions and orientations that exist in each grid is counted, and presented at the center of each grid. Then, the grid which includes the highest number of votes (4) is selected. This bin is the fourth grid from the left and the third grid from the top in FIG. 9B.

Figure 9C:
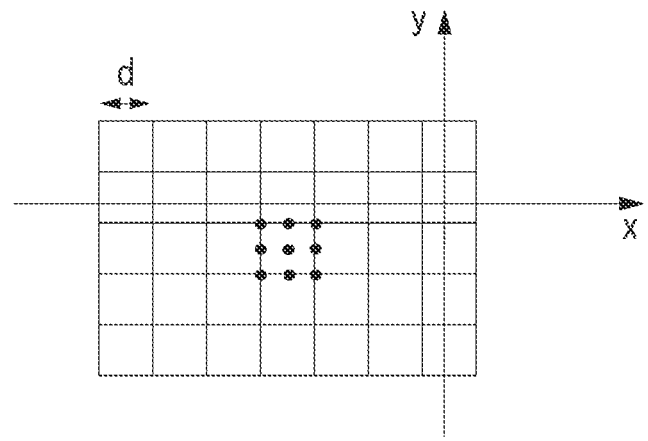

Lastly, the candidate positions and orientations are generated in the selected bin at predetermined intervals. The predetermined interval can be set at an appropriate value based on the number of the candidate positions and orientations obtained by inverse operation of the permissible time requested for the system. Further, it is not always necessary to even up the interval, and the candidate positions and orientations may be randomly generated for the number of the candidate positions and orientations in the bin. FIG. 9C illustrates a case where nine candidate positions and orientations are generated.

With respect to the candidate positions and orientations generated in this manner, the processing from step S404 in FIG. 4 according to the first exemplary embodiment is executed.

In this manner, according to the present exemplary embodiment, by summing up the distribution of the coarse positions and orientations at a predetermined sampling interval and using it, the result can be obtained more simply and at a higher speed compared to the first exemplary embodiment.

According to the first and the second exemplary embodiments, the generation method of the candidate positions and orientations based on the distribution of the coarse positions and orientations based on the assumption that the possible plurality of coarse positions and orientations of the measurement target object can be obtained, is described. However, the generation of the candidate positions and orientations is not limited to the method based on the distribution of the coarse positions and orientations. For example, if the coarse positions and orientations are to be estimated by template matching, the resolution of the estimated position and orientation is determined according to the number of the templates that match or the step width to be used in the search. In such a case, with respect to the actual position and orientation, ambiguity of the estimated position and orientation occurs in the range of the resolution of the coarse positions and orientations. According to a third exemplary embodiment, the method for generating the candidate positions and orientations based on the resolution of the coarse position and orientation estimate, will be described considering the ambiguity described above. The processing described below replaces the processing in step S403 in FIG. 4 by which the candidate positions and orientations is determined according to the first exemplary embodiment.

First, the resolution of the coarse positions and orientations is determined. The resolution of the coarse positions and orientations is a minimum step width that expresses the position and orientation. For example, if the resolution of the position is 1 mm, the coarse position and orientation is not estimated using a value smaller than 1 mm. The resolution of the coarse positions and orientations is determined according to a sampling width or the accuracy of the coarse positions and orientations or a size of the measurement target object. For example, if the method based on pattern matching, which is used in step S402 in FIG. 4 according to the first exemplary embodiment, is used as an estimation method of the coarse positions and orientations, the resolution of the orientation is determined based on the sampling width of the orientation which is registered as the pattern to be used for the matching. For example, if the orientation parameter is sampled and subjected to pattern matching in eight degrees of a geodesic dome, the eight degrees as the sampling width will be the resolution of the orientation. Further, the resolution of the position can be obtained by calculating the possible error range with respect to the estimation of the position using the resolution of the orientation. More precisely, using the formula below, the maximum misalignment width "d" mm which is based on the orientation is obtained based on a resolution ω [rad] of the orientation parameter and a length "w" mm of the long side of the measurement target object. Then, the calculated "d" is set as the resolution of the position.

$$\Delta s = (J^T W J)^{-1} J^T W E \qquad \text{Formula 14}$$

According to the present exemplary embodiment, by the method described above, the resolution of the coarse position and orientation is determined based on the sampling width of the orientation and the size of the measurement target object. However, the determination method of the coarse position and orientation is not limited to the method described above. For example, the resolution of the position may be set based on the resolution of the image to be used for the estimation of the coarse position and orientation. Further, it may be set based on the ambiguity of the estimation of the position and orientation which is assumed based on the noise of the image sensor or the shape of the measurement target object discussed in the nonpatent literature below. W. Hoff and T. Vincent, "Analysis of head pose accuracy in augmented reality" IEEE Transactions on Visualization and Computer Graphics, vol. 6, no. 4, pp. 319-334, 2000.

Further, the resolution of the position can be set in advance as a setting parameter by a user. Any determination method may be used so long as the resolution as the minimum possible step width of the coarse position and orientation can be determined. The nature of the present invention is not impaired by the determination method.

Next, the candidate positions and orientations are generated based on the resolution of the coarse positions and orientations. More precisely, the candidate positions and orientations are samples generated at predetermined intervals in a range of the width of the resolution of the coarse positions and orientations having the coarse position and orientation at the center. The sampling interval may be set to an appropriate value based on the number of the candidate positions and orientations obtained by inverse operation from the permissible time required for the system. Further, the sampling interval of the candidate positions and orientations is not necessary a predetermined interval, and may be set for the number of the candidate of positions and orientations at random. As for the coarse positions and orientations at the centre of the generated candidates, the mean value of the distribution of the coarse positions and orientations obtained in the processing in step S402 in FIG. 4 according to the first exemplary embodiment may be used. Further, if a single coarse position and orientation point is acquired instead of the distribution of the coarse positions and orientations, that single coarse position and orientation point may be used. The generation method of the candidate positions and orientations is not limited to the method described above. For example, from the resolution of the coarse positions and orientations, the possible range of the positions and orientations may be approximated by the Gaussian distribution, and the candidate positions and orientations may be generated, as is the case with the first exemplary embodiment. In this case, a mean vector p of the multidimensional Gaussian distribution associated with the six parameters of the position and orientation is obtained from the distribution of a mean value of the coarse position and orientation obtained in the processing in step S402 in FIG. 4 according to the first exemplary embodiment. Then, the multidimensional Gaussian distribution based on the resolution of the coarse position and orientation is calculated by setting a variance-covariance matrix Z of the Gaussian distribution using the resolution width of the coarse position and orientation. Further, the candidate positions and orientations are generated by sampling, as is performed in step S403 in FIG. 4 according to the first exemplary embodiment, a predetermined number of positions and orientations based on the obtained Gaussian distribution. The position and orientation based on the Gaussian distribution may be generated by using the distribution that approximates the distribution of the coarse positions and orientations illustrated in the first exemplary embodiment as well as the Gaussian distribution based on the resolution. In such a case, more specifically, the distribution obtained by adding the Gaussian distribution based on the above-described resolution is added to the Gaussian distribution obtained by the method in step S403 in FIG. 4 according to the first exemplary embodiment. Then, based on the obtained distribution, the candidate positions and orientations may be generated by a method similar to the method in step S403 in FIG. 4 according to the first exemplary embodiment.

As described above, regarding the generation of the candidate positions and orientations, the generation method is not limited and any method can be used so long as the candidate positions and orientations can be generated based on the resolution of the coarse positions and orientations.

With respect to the candidate positions and orientations generated in this manner, the processing from step S404 in FIG. 4 is executed as performed in the first exemplary embodiment.

In this manner, according to the present exemplary embodiment, in a scene where the coarse positions and orientations and the resolution of the coarse positions and orientations are known, by generating the candidate positions and orientations based on the possible error distribution of the position and orientation determined by the resolution, robust measurement of the position and orientation can be performed even if the coarse positions and orientations are acquired by low resolution.

According to the first exemplary embodiment, the possible distribution of the coarse positions and orientations of the measurement target object is acquired by full search. However, actually, at the site where a robot holds and assembles the measurement target object, the components may be aligned in advance and the full search may not be necessary. In this case, the position and orientation of the arranged components can be considered as substantially similar.

According to a fourth exemplary embodiment, a method used for determining the distribution of the positions and orientations at which the model information is determined based on the edge distribution included in the three-dimensional model information of the target component in the coarse position and orientation, will be described. The processing described below replaces step S402 in FIG. 4 by which the candidate positions and orientations are determined according to the first exemplary embodiment.

Figure 10:
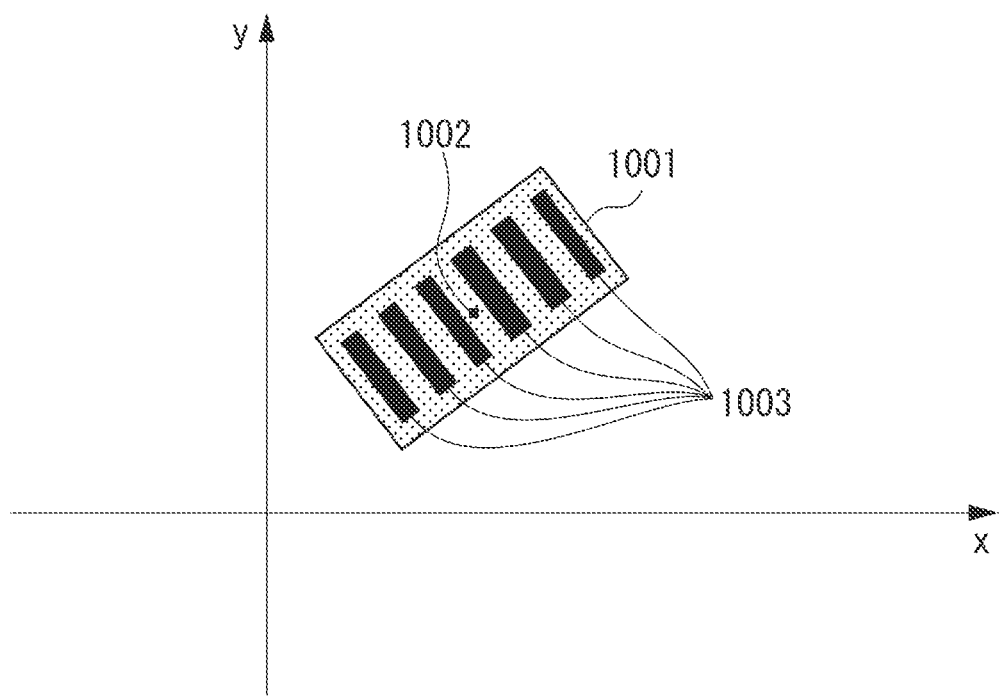
FIG. 10 illustrates a three-dimensional model in the coarse position and orientation.

FIG. 10 illustrates a measurement target object at a known coarse position and orientation.

A three-dimensional model 1001 is arranged at a coarse position and orientation.

A center of gravity 1002 is a center of gravity of the three-dimensional model 1001. When a position of a three-dimensional model is indicated in the coordinate system of the system, the position is expressed by the coordinates of this center of gravity.

A texture 1003 corresponds to vertical stripes of the measurement target object. Texture information is based on the texture 1003. When a corresponding point is searched in a case where fitting of a measurement target object having the texture 1003 is performed using an edge, a corresponding point of an adjacent vertical stripe may be used by error. Then, the fitting may be misaligned in the vertical direction with respect to the vertical stripes.

According to the present exemplary embodiment, the possible positions and orientations (candidate positions and orientations) of the measurement target object are considered as distributed in the vertical direction with respect to the vertical stripes as described above. Thus, the initial (candidate) values are arranged to have a distribution corresponding to the texture of the target object. Further, the initial values are compared with the calculation result of the positions and orientations. Furthermore, the positions and orientations with the best match is output as the correct position and orientation.

Details of the above-described processing will be described.

Figure 11A:
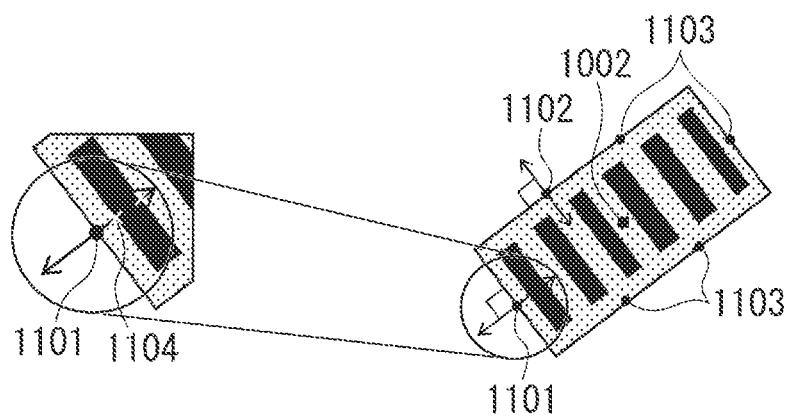
FIGS. 11A and 11B illustrate how to obtain a distribution of edge detection points from the three-dimensional model of the coarse position and orientation.

FIG. 11A illustrates the search of the edge having a control point of the three-dimensional model as a starting point. Each of control points 1101, 1102, and 1103 is an example of the control point and is similar to the control point 702 described above according to the first exemplary embodiment. Regarding each of the control points, a search line is drawn in the vertical direction with respect to the edge having the control point, and the distribution of the edge is searched. As for the search of the edge, the method described in step S602 in FIG. 6 according to the first exemplary embodiment will be used.

A detection point 1104 is a detection point of the edge when the search is performed using the control point 1101 as the starting point. A relative position of the detection point 1104 and the control point 1101 is recorded as a position obtained by setting the center of gravity 1002 as the starting point.

Next, the edge is searched using the control point 1102 as a starting point. In this case, since an edge does not exist on the search line as illustrated in FIG. 11A, the edge is not detected. In this manner, the edge is searched for all the control points. Then, the relative position of the detected point and the control point is recorded as a position obtained by setting the center of gravity as the starting point.

Figure 11B:
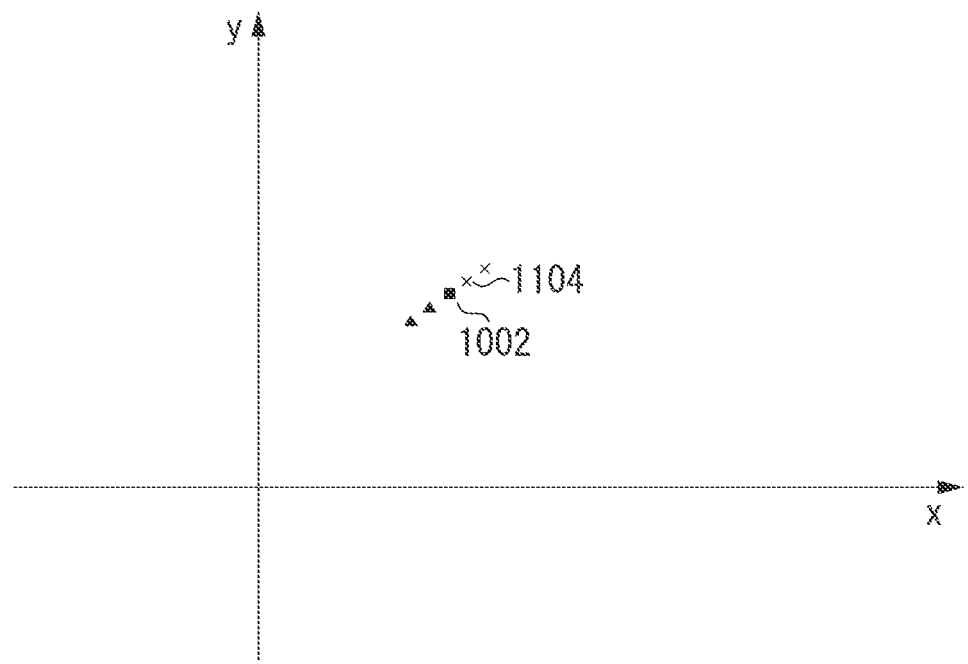

FIG. 11B illustrates the distribution of the edge detection points which have been recorded as described above. The distribution of the positions is obtained by shifting the distribution of the positions of the edge detection points which have been detected from the control points so that the center of gravity becomes the starting point. In FIG. 11B, the two points represented by X are the points detected from the control point 1101. The detection point 1104 in FIG. 11A corresponds to the detection point 1104 in FIG. 11B. In FIG. 11B, the points represented by a black triangle are points detected from other control points. In FIG. 11B, although different signs are used for the plotting of the points, all of such signs are to be considered as representing the points of a similar distribution in the processing below. The distribution of the edge detection points obtained in this manner shows the direction and the number of points in the three-dimensional model which can cause mis-correspondence when the corresponding points are searched from the control points of the three-dimensional model.

Thus, it is considered that many local solutions are in the position of this distribution. Accordingly, by generating the candidate positions and orientations according to this distribution, the robustness of the fitting can be improved. The processing in step S403 and subsequent steps in FIG. 4 according to the first exemplary embodiment is performed by using this distribution as the distribution of the candidate positions and orientations.

According to the present exemplary embodiment, an edge of a texture is described as an edge that may cause mis-correspondence. However, the effect of the present invention is not limited to the edge which is derived from the texture. In other words, the edge can be derived from a feature other than the texture such as an edge derived from the shape of the measurement target object.

A shape including a serrated repetitive pattern is a simple example of an edge which can cause the mis-correspondence derived from the shape. Regarding such a shape, according to the method of the present exemplary embodiment, the optimum position and orientation can be determined by generating the candidate positions and orientations in a comprehensive manner considering that the possible positions and orientations are distributed in the direction where the serrated pattern is aligned.

According to the present exemplary embodiment, it is considered that the major reason for the mis-correspondence is due to the mis-correspondence of the edge. Thus, the distribution of the candidate positions and orientations is obtained with respect to only the translation component in the xy directions of the two-dimensional plane of the captured image.

However, this determination of the distribution of the candidate positions and orientations is not limited to the two-dimensional plane and can be similarly performed in the three-dimensional space. In other words, processing similar to the search of the edge using the control point of the three-dimensional model as the starting point, which has been described with reference to FIG. 11, can be performed in the three-dimensional space. More precisely, the distribution may be generated by searching the face in the normal direction of the face including the control point of the three-dimensional model.

Further, it is possible to generate the distribution of the candidate positions and orientations by similarly performing searching in the two-dimensional or three-dimensional rotation. More precisely, with respect to a plurality of rotation axes which has been subjected to sampling, the edge is searched in the circumferential direction in the range of a predetermined rotation amount for each control point of the three-dimensional model. If a feature is detected, the rotation axis and the rotation amount at that time are voted as a matching result. In other words, the candidate position and orientation point is obtained by using the coarse position and orientation and the information of the three-dimensional model. Then, by generating a plurality of candidate positions and orientations, the robustness can be improved. This is the idea of the fourth exemplary embodiment of the present invention.

Thus, according to the present exemplary embodiment, in a scene where the coarse position and orientation is known, the distribution of the candidate positions and orientations is determined based on a known coarse positions and orientations and the three-dimensional model information. Then, a plurality of positions and orientations which can be the local solution is comprehensively verified based on the distribution. Accordingly, a robust measurement of the position and orientation can be performed even for a target object having a complex shape.

According to the fourth exemplary embodiment, the possible distribution of the positions and orientations of the measurement target object have been obtained in the virtual environment from the coarse positions and orientations of the measurement target object and the three-dimensional model. Then, the problem regarding mis-correspondence of an edge of the component with a different edge when a corresponding point of the three-dimensional model of the coarse positions and orientations of the measurement target object and the captured image is generated, has been dealt with.

As another problem, there is mis-correspondence with the edges which is distributed in the periphery of the component in the coarse position and orientation of the image obtained from the imaging apparatus. According to a fifth exemplary embodiment, when the coarse position and orientation of the arranged measurement target object is known, the candidate position and orientation is determined based on the relative position distribution having the point of origin of the three-dimensional model information of the coarse position and orientation, of the feature of the captured image.

The processing described below replaces step S402 in FIG. 4 by which the positions and orientations are determined according to the first exemplary embodiment.

Figure 12:
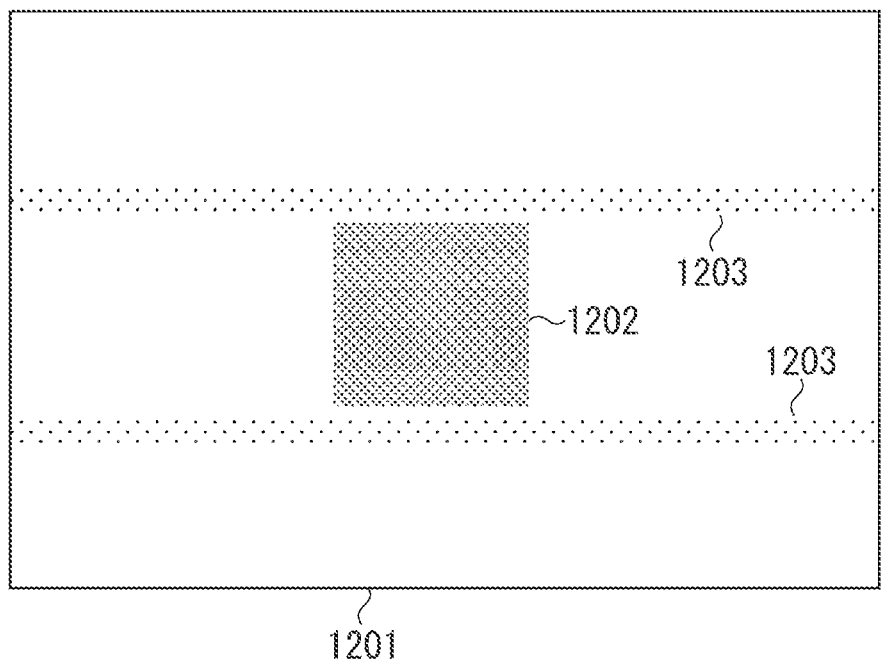
FIG. 12 illustrates a luminance image including noise in the background of the measurement target object.

FIG. 12 is a luminance image which has been captured. A frame 1201 is an outer frame of a luminance image which is obtained from the imaging apparatus 103. A measurement target object 1202 is a measurement target object in the luminance image. Horizontal stripes 1203 are horizontal stripes (noise) in the luminance image. The noise in this context indicates that it is not the measurement target object 1202. In other words, the noise may be derived from an object in the background of the measurement target object or the background itself.

According to the present exemplary embodiment, the noise is assumed to be caused by a different object. In such a case, when the measurement target object 1202 is subjected to the fitting using the edge, the horizontal stripes in the background above or below the measurement target object due to the other object may be used in the fitting by error when the corresponding point is searched. Accordingly, offset fitting in the vertical direction in FIG. 12 may occur.

According to the present exemplary embodiment, it is considered that the possible position and orientation of the component is, as described above, distributed in the vertical direction in FIG. 12. Thus, the candidate positions and orientations are comprehensively set in the vertical direction. Then, the results obtained by comparing the calculation results of the position and orientation are compared, and result that matches well is finally output as the correct position and orientation.

Details of the above-described processing will be described below. Although the horizontal stripes in the background is described as an example of the effect of the method, the present invention can be realized in association with any texture by a similar method.

Figure 13A:
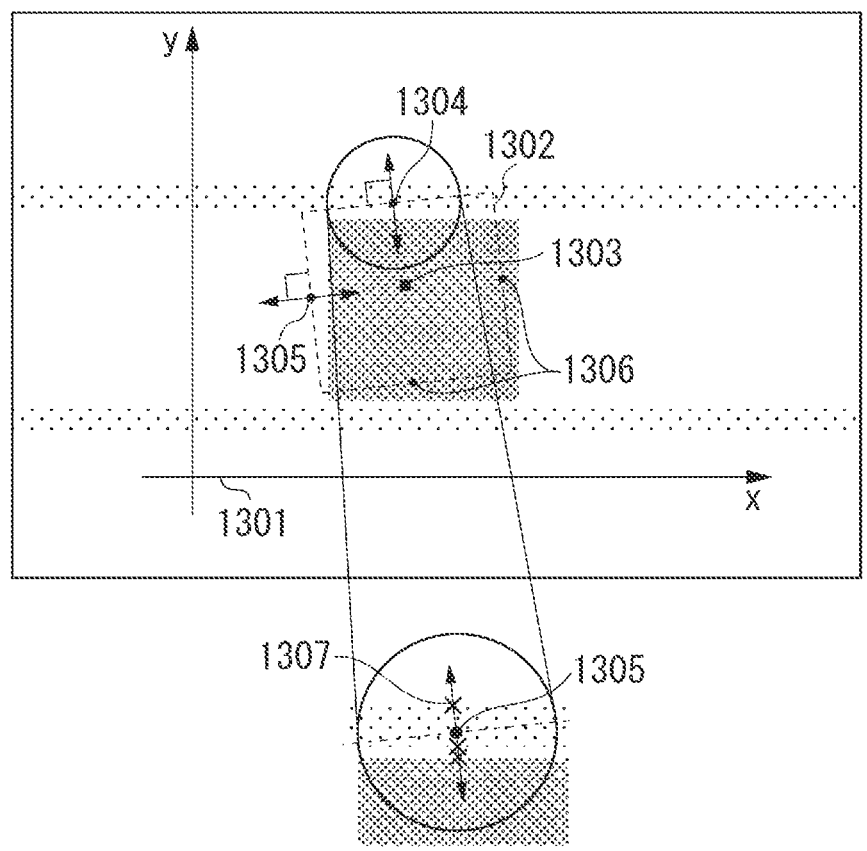
FIGS. 13A and 13B illustrate how to obtain the distribution of the edge detection points from the luminance image.

FIG. 13A illustrates a method used for searching an edge in the luminance image using the control point of the three-dimensional model as a starting point.

A coordinate axis 1301 is a coordinate system of the system. A projected image 1302 is an image projected on the luminance image of a three-dimensional model edge in the coarse position and orientation. A projection point 1303 is a center of gravity of the three-dimensional model in the coarse position and orientation projected on the luminance image.

Control points 1304, 1305, and 1306 are examples of the control point. These points are similar to the control point 702 described above in the first exemplary embodiment. A search line is drawn in the direction vertical to the edge where such a control point is set and the edge is searched. Regarding the search of the edge, a method similar to the one described in step S602 in FIG. 6 according to the first exemplary embodiment will be used. A detection point 1307 is a detection point of an edge which is searched in a case where the control point 1304 is set as the starting point. Then, a point obtained by shifting the relative position with respect to the control point 1304 so that the center of gravity 1303 becomes the starting point, is recorded. Next, the edge having the control point 1302 as the starting point is searched. In this case, one detection point is recorded in the right direction. Similarly, the edge is searched at each of all the control points. Then, the point obtained by shifting the relative position of the detected point and the control point with respect to the center of gravity as the starting point is recorded.

Figure 13B:
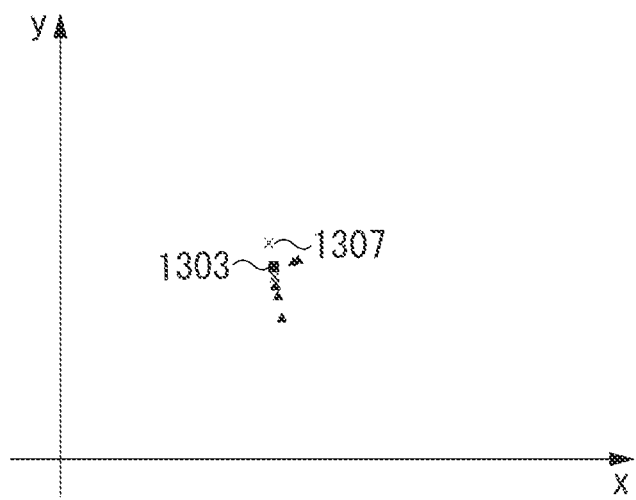

FIG. 13B illustrates the distribution of the edge detection points which have been recorded. The distribution of the edge detection points is the distribution of the positions of the edge detection points detected from the control points and shifted so that the center of gravity becomes the starting point. In FIG. 13B, the three points plotted by X are the three points detected from the control point 1305. The detection point 1307 in FIG. 13A corresponds to the detection point 1307 in FIG. 13B. The points plotted by a black triangle in FIG. 13B are the points detected from other control points.

In FIG. 13B, although different signs are used for the plotting of the points, all of such signs are to be considered as representing the points of a similar distribution in the processing below. The distribution of the edge detection points obtained in this manner shows the direction and the number of mis-corresponding points which may be detected when the corresponding points are searched from the control points of the three-dimensional model. Thus, it is considered that many local solutions are in the position of this distribution. Accordingly, by generating the initial position and orientation according to this distribution, the robustness of the fitting can be improved. The processing in step S403 and subsequent steps in FIG. 4 according to the first exemplary embodiment is performed by using this distribution as the distribution of the positions and orientations.

According to the present exemplary embodiment, an edge of a texture is described as an edge that may be mis-correspondent. However, the effect of the present invention is not limited to the edge which is derived from the texture. In other words, the edge can be derived from a feature other than the texture such as an edge derived from the shape of the three-dimensional model or the background.

According to the present exemplary embodiment, as is the case with the fourth exemplary embodiment, the position and orientation distribution is obtained for only the translation component in the xy directions of the position and orientation in the two-dimensional plane of the captured image. However, this determination of the position and orientation distribution is not limited to the two-dimensional plane and can be similarly performed with respect to the three-dimensional space.

Processing similar to the edge search processing having the control point of the three-dimensional model as the starting point described with reference to FIG. 13 may be performed in the three-dimensional space. More precisely, by setting the control point of the three-dimensional model as the starting point, a corresponding point is searched in the normal direction of the face on which the control point exists for each control point. Then, the distribution of the obtained corresponding points is obtained.

Further, regarding the rotation in the two-dimensional plane and the three-dimensional space, it is possible to generate the distribution of the position and orientation according to a similar search. More precisely, regarding a plurality of rotation axes which have been sampled, the edge is searched by rotating each control point of the three-dimensional model in a range of a predetermined rotation amount in the circumferential direction. When a feature is detected, the rotation axis and the rotation amount at that time is voted as a matching result. In other words, regardless of the dimension, by not obtaining the distribution of the position and orientation by performing the full search of the captured image, by searching only the periphery of the three-dimensional model arranged according to the coarse position and orientation from the captured image, a plurality of initial positions and orientations is generated. The main concept of the fifth exemplary embodiment of the present invention is to enhance the robustness by such a method.

In this manner, according to the present exemplary embodiment, in a scene where the coarse position and orientation is known, the distribution of the positions and orientations is determined by performing search in the periphery of the three-dimensional model with respect to the coarse position and orientation in the image. Then, by comprehensively verifying the plurality of positions and orientations which can be the local solution based on this distribution, robust measurement of position and orientation can be performed even the environment includes a lot of noise and the target object has a complex shape.

According to the fourth and the fifth exemplary embodiments, the position and orientation of the three-dimensional model which is projected on the image is obtained as the shape information to which the distribution of the positions and orientations is to be fitted, with respect to an image. However, as the supplementary information has been added to each exemplary embodiment, one of two pieces of shape information is not necessarily an image according to the present invention. For example, if the two pieces of shape information includes some corresponding area, the present invention can be applied to fitting of shape information of an arbitrary type.

For example, the present invention can be applied to fitting of two pieces of three-dimensional shape information. As an example, a case where two mesh models generated by imaging a certain target object from two view points are subjected to fitting based on the shape of the area where the two mesh models overlap will be described. In other words, the two mesh models overlap at least some area. Thus, the fact that the present invention is applicable to fitting of two pieces of three-dimensional shape information will be described.

Figure 14:
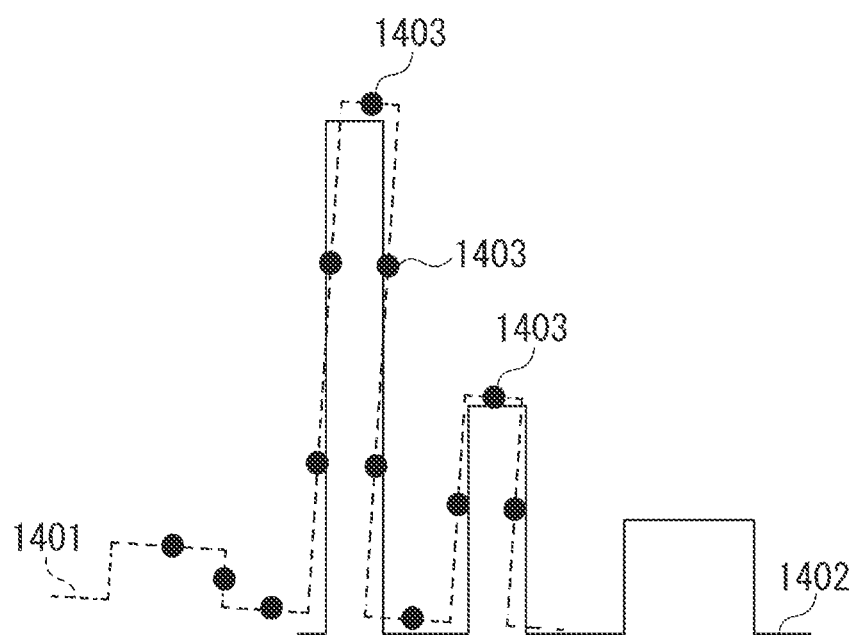
FIG. 14 illustrates a concept of the sixth exemplary embodiment of the present invention.

FIG. 14 illustrates an example of a mesh model 1401 represented by a dotted line (first shape information) fitted to a mesh model 1402 represented by a solid line (second shape information) by two-dimensional projection. Each of control points 1403 is a predetermined control point on the mesh model 1401. A candidate corresponding point is searched in a predetermined range in the normal direction of the face on which the point exists from each control point. As is the processing performed with respect to FIG. 11B or 13B, regarding the candidate corresponding points which have been searched, the vectors from the control points to the candidate corresponding points are plotted having the center of gravity of the mesh model 1401 as the center, and the general distribution of the candidate positions and orientations in the three-dimensional space is generated. Then, the processing in step S403 and subsequent steps in FIG. 4 according to the first exemplary embodiment is performed using this distribution as the distribution of the positions and orientations.

The candidate positions and orientations are generated by a different method in each of the first to the sixth exemplary embodiments. Actually, according to a seventh exemplary embodiment of the present invention, the robust measurement of the position and orientation can be realized not by independently performing each method alone. More precisely, by using a distribution which is obtained by summing up a part or whole of the distribution as the distribution of the position and orientation and then performing processing in step S403 in order to generate a plurality of initial positions and orientations, the robust measurement can be realized.

As a useful application example of the information processing apparatus according to the present invention, there is the measurement of the position and orientation of the target component of a system where operations such as holding, moving, and releasing a component by an industrial robot arm are performed. An application example of the information processing apparatus according to the present invention will be described with reference to FIG. 15.

Figure 15:
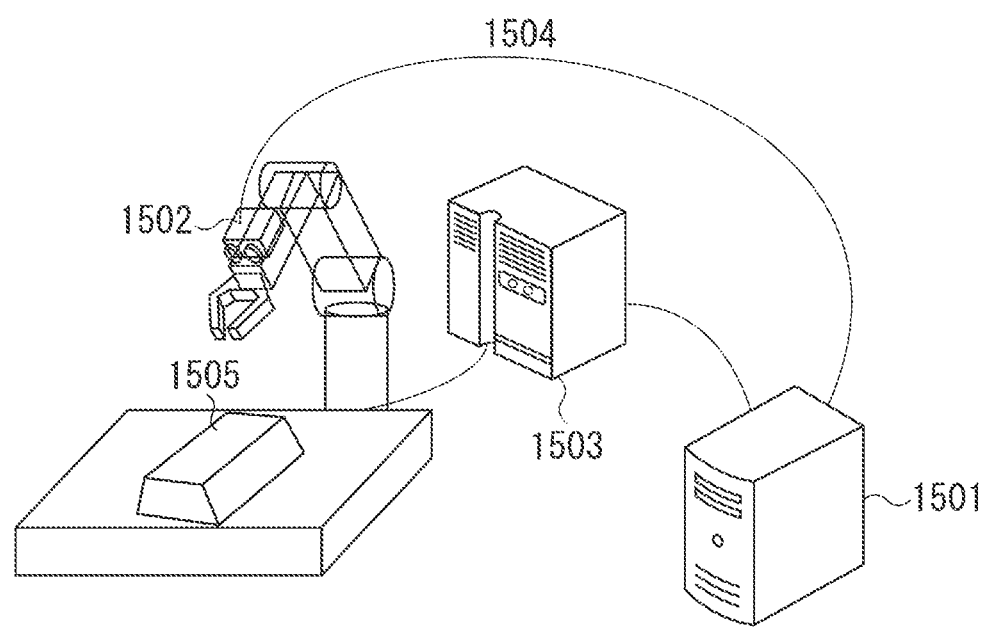
FIG. 15 illustrates a configuration example of a robot system according to an eighth exemplary embodiment of the present invention.

FIG. 15 illustrates an example of a schematic configuration of an information processing system including the information processing apparatus according to a eighth exemplary embodiment of the present invention. In FIG. 15, the system includes a PC 1501 and a camera and projector 1502. The PC 1501 and the camera and projector 1502 are similar to the system described according to the first to the sixth exemplary embodiments, store the program including the above-described processing procedure, and measure the position and orientation of a target component 1505. A robot controller 1503 controls a robot arm 1504. The robot arm 1504 includes a movable axis including a rotation axis and/or a translational axis. The robot controller 1503 is connected to the PC 1501. When the robot arm 1504 receives a command from the PC 1501, the command is converted into an actual control command. Then, the robot arm 1504 moves according to the control command.

In addition to the above-described procedures, the PC 1501 according to the present exemplary embodiment further performs the following processing procedure. First, the PC 1501 stores the relative relation of the robot coordinate system defined by the system coordinate system described in the first to the fifth exemplary embodiments, which is, in other words, the camera coordinate system and the robot arm. The PC 1501 measures the position and orientation of the target component and converts the result from the camera coordinate system to the robot coordinate system. Then, based on the converted position and orientation of the component in the robot coordinate system, the robot arm is moved to the position and orientation where it can hold the component via the robot controller.

In this manner, according to the present exemplary embodiment, regarding a robot system having a camera and a projector mounted on a robot arm, an unknown component can be held by controlling the robot arm based on the measurement result of the position and orientation of the component.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Effect of Exemplary Embodiments

As described above, a robust measurement of the position and orientation can be achieved by obtaining a coarse position and orientation of the target object, newly generating the candidate initial position and orientation based on the obtained coarse position and orientation, and obtaining the position and orientation based on the candidate initial position and orientation.

According to the first exemplary embodiment, from the result obtained by performing a full search of the measurement target object in the image, the distribution of the coarse position and orientation is determined, and by comprehensively verifying a plurality of positions and orientations which can be a local solution based on the determined distribution, robust measurement of the position and orientation can be performed even if there is a lot of noise in the environment or the measurement target object has a complex shape.

According to the second exemplary embodiment, by summing up and using the distribution of the coarse positions and orientations in a predetermined sampling interval, a method that can realize a simple and high speed processing compared to the first exemplary embodiment can be realized.

According to the third exemplary embodiment, in a scene where the coarse positions and orientations and the resolution or error of the coarse positions and orientations are known, by generating the candidate positions and orientations based on the possible error distribution of the position and orientation determined by the resolution, robust measurement of the position and orientation can be performed even if the coarse positions and orientations are acquired by low resolution.

According to the fourth exemplary embodiment, in a scene where the coarse position and orientation is known, the candidate positions and orientations are generated based on a known coarse positions and orientations and the three-dimensional model information. Further, a plurality of positions and orientations which can be the local solution is comprehensively verified based on the generated candidate positions and orientations. Accordingly, a robust measurement of the position and orientation can be performed even for a target object having a complex shape.

According to the fifth exemplary embodiment, in a scene where the coarse position and orientation is known, the candidate positions and orientations are generated according to search processing performed in the periphery of the three-dimensional model of the coarse positions and orientations in the image. Then, a plurality of positions and orientations which can be the local solution is comprehensively verified based on the generated candidate positions and orientations. Accordingly, a robust position and orientation measurement can be performed even if the environment includes a lot of noise or the target object has a complex shape.

According to the sixth exemplary embodiment, if the two pieces of shape information includes some corresponding area, the present invention can be applied to fitting of shape information of an arbitrary type. Thus, with respect to an object of an unknown shape such as a CAD model, by fitting data captured from a plurality of directions, the data can be coupled.

According to the seventh exemplary embodiment, a robust position and orientation measurement can be obtained by using a sum set of the candidate positions and orientations generated by all or a part of generation methods of the candidate positions and orientations described in the first to the fifth exemplary embodiments as the plurality of candidate positions and orientations.

According to the eighth exemplary embodiment, regarding a robot system having a camera and a projector mounted on a robot arm, an unknown component can be held by a control of the robot arm based on the measurement result of the position and orientation of the component.

Definition

According to the description of the present invention, as for the first to the fifth exemplary embodiments, a combination of three-dimensional model information and an image including an measurement target object captured by the camera is used as a combination of the shape information used for the fitting. As for the sixth exemplary embodiment, a combination of the three-dimensional mesh models is described. However, the combination of the shape information is not limited to such an example. In other words, any information can be used so long as it allows the fitting of the shape information. As an example of the shape information of the object, three-dimensional point group information obtained by measurement by a laser range sensor can be used in addition to the three-dimensional model information and the image.

The projector is not limited to a liquid crystal projector and a projector of a different method can be used so long as it can project a pattern light. For example, it can be a projector using a digital micro-mirror device (DMD) or a liquid crystal on silicon (LCOS).

Regarding the calculation of the position and orientation, although the fitting is performed by simultaneously using the two-dimensional and the three-dimensional scale, the present invention is similarly applicable to only the two-dimensional scale or only the three-dimensional scale.

The calculation method of the position and orientation of the measurement target object according to the present invention is not necessarily the Gauss-Newton method. For example, the Levenberg-Marquardt algorithm which is more robust with respect to the calculation, or the method of steepest descent which is a simpler method can be used. Further, a different nonlinear optimization calculation method such as a conjugate gradient method or an incomplete Cholesky-conjugate gradient (ICCG) method can also be used.

In determining the distribution of the coarse position and orientation, the image, which is used for searching the position and orientation of a particular component in the image, is not limited to the luminance image. In other words, three-dimensional information such as the distance image can also be used in determining the coarse position and orientation of the component.

Further, although the full search is used for determining the distribution of the coarse positions and orientations in the description above, it is not always necessary to perform the full search of the image according to the present invention. For example, if a component is consistently placed at a substantially same place in the work area, it is possible to use the partial search of only that area.

Regarding the determination of the distribution of the positions and orientations according to the fourth exemplary embodiment of the present invention, the search range of the distribution of the positions and orientations is not limited to the translation component in the xy directions of the two-dimensional plane. The determination of the distribution of the positions and orientations is not limited to the two-dimensional plane, and can be similarly performed in the three-dimensional space. In other words, processing similar to the search of the edge using the control point of the three-dimensional model as the starting point which has been described with reference to FIG. 11 can be performed in the three-dimensional space.

More precisely, the distribution can be generated by searching the face in the normal direction of the face including the control point of the three-dimensional model. Further, it is possible to generate the distribution of the positions and orientations by similarly performing searching in the two-dimensional or three-dimensional rotation. More precisely, with respect to a plurality of rotation axes which has been subjected to sampling, the edge is searched in the circumferential direction in the range of a predetermined rotation amount for each control point of the three-dimensional model. If a feature is detected, the rotation axis and the rotation amount at that time are considered as a matching result.

Regarding the determination of the distribution of the positions and orientations according to the fifth exemplary embodiment of the present invention, the search range of the distribution of the coarse positions and orientations is not limited to the translation component in the xy directions of the two-dimensional plane. The determination of the distribution of the positions and orientations is not limited to the two-dimensional plane and can be similarly performed in the three-dimensional space. In other words, processing similar to the search of the edge using the control point of the three-dimensional model as the starting point which has been described with reference to FIG. 13, can be performed in the three-dimensional space. More precisely, by setting the control point of the three-dimensional model as the starting point, a corresponding point is searched in the normal direction of the face on which the control point exists for each control point. Then, the distribution of the obtained corresponding points is obtained. Further, it is possible to generate the distribution of the positions and orientations by similarly performing searching in the two-dimensional or three-dimensional rotation.

Regarding the determination of the distribution of the candidate positions and orientations described in the fourth and the fifth exemplary embodiments of the present invention, the feature of the shape information is not limited to the edge derived from the texture, and can be any type of edge so long as it can be the grounds for the association processing performed in step S602 in FIG. 6. For example, it can be a feature other than the texture such as an edge derived from the shape of the three-dimensional model.

Regarding the generation of the candidate positions and orientations, since the positions and orientations which are set as the distribution of the coarse positions and orientations are considered to have certain reasonability, they are employed as the initial candidate positions and orientations. However, according to the present invention, only the newly-generated candidate positions and orientations may be employed as the candidate positions and orientations, and the distribution of the coarse positions and orientations may not be used.

Although the Gaussian distribution is used as the probability density model in the generation of the candidate positions and orientations, actually, other distribution model may be used as the probability density model so long as it can summarize the obtained distribution. Further, a squared distribution may also be used.

Regarding the generation of the candidate positions and orientations according to the second exemplary embodiment of the present invention, when the initial values are generated in the selected bin at predetermined intervals, it is not always necessary to even up the interval and the candidate positions and orientations may be randomly generated for the number of the candidate positions and orientations in the bin.

Further, regarding the selection of the candidate positions and orientations, any value may be used as the score so long as it expresses a matching degree of the three-dimensional model and the luminance image and the distance image. For example, a method that obtains an error vector between the three-dimensional model and the luminance image and the distance image and uses the reciprocal of the norm may be used. However, a different index may also be used.

In the selection of the candidate positions and orientations, before the candidate positions and orientations are evaluated by the score, the position and orientation update processing in steps S601 to S606 is performed once. However, the number of times of such processing being performed is not limited to once, and the method is not limited so long as an appropriate position and orientation is determined at a high speed.

According to the present invention, a robust measurement of the positions and orientations can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A position and orientation measurement apparatus comprising:
   one or more processors; and
   a memory coupled to the one or more processors, the memory having stored thereon instructions which, when executed by the one or more processors, cause the apparatus to:
   acquire, from an image including a target object, a plurality of coarse positions and orientations of the target object;
   determine a resolution of the plurality of coarse positions and orientations of the target object;
   generate, based on the resolution of the plurality of coarse positions and orientations, a predetermined number of initial candidate positions and orientations including at least one set of position and orientation which is different from any of the acquired coarse positions and orientations; and
   derive the position and orientation of the target object in the image by associating model information of the target object with respective positions and orientations of the predetermined number of generated initial candidate positions and orientations.

2. The position and orientation measurement apparatus according to claim 1, wherein the plurality of coarse positions and orientations of the target object in the image are acquired by performing pattern matching with respect to the image.

3. The position and orientation measurement apparatus according to claim 2, wherein the pattern matching is performed by searching the image by using model information of the target object.

4. The position and orientation measurement apparatus according to claim 1, wherein in generating the predetermined number of initial candidate positions and orientations, at least one initial candidate position and orientation is generated based on the resolution of the plurality of coarse positions and orientations, texture information of the target object, and the image.

5. The position and orientation measurement apparatus according to claim 1, wherein in generating the predetermined number of initial candidate positions and orientations, at least one initial candidate position and orientation is generated based on the acquired coarse position and orientation and shape information of the target object.

6. The position and orientation measurement apparatus according to claim 1, wherein in generating the predetermined number of initial candidate positions and orientations, at least one initial candidate position and orientation is generated based on the resolution of position and orientation, shape information of the target object, and the image.

7. The position and orientation measurement apparatus according to claim 1, wherein in generating the predetermined number of initial candidate positions and orientations, the predetermined number of initial candidate positions and orientations are selected from generated candidate positions and orientations.

8. The position and orientation measurement apparatus according to claim 7, wherein the predetermined number of initial candidate positions and orientations are selected based on a shift amount which is generated when associating the model information with the target object in the image.

9. The position and orientation measurement apparatus according to claim 1, wherein in deriving the position and orientation of the target object, the position and orientation of the target object in the image is derived by extracting an edge from the generated initial candidate position and orientation and comparing the extracted edge and an edge extracted from shape information of the target object.

10. An information processing method for measuring a position and orientation of a target object, the information processing method comprising:
   acquiring, from an image including a target object, a plurality of coarse positions and orientations of the target object;
   determining a resolution of the plurality of coarse positions and orientations of the target object;
   generating, based on the resolution of the plurality of coarse positions and orientations, a predetermined number of initial candidate positions and orientations including at least one set of position and orientation which is different from any of the acquired coarse positions and orientations; and
   deriving the position and orientation of the target object in the image by associating model information of the target object with respective positions and orientations of the predetermined number of generated initial candidate positions and orientations.

11. A non-transitory computer-readable storage medium storing a computer-executable program for causing a computer to execute a position and orientation measurement method comprising:
   acquiring, from an image including a target object, a plurality of coarse positions and orientations of the target object;
   determining a resolution of the plurality of coarse positions and orientations of the target object;
   generating, based on the resolution of the plurality of coarse positions and orientations, a predetermined number of initial candidate positions and orientations including at least one set of position and orientation which is different from any of the acquired coarse positions and orientations; and
   deriving the position and orientation of the target object in the image by associating model information of the target object with respective positions and orientations of the predetermined number of generated initial candidate positions and orientations.

* * * * *